US012636125B2

(12) United States Patent
Popov et al.

(10) Patent No.: US 12,636,125 B2
(45) Date of Patent: May 26, 2026

(54) METHODS AND APPARATUSES FOR PREPARING A VIRTUAL THREE-DIMENSIONAL MODEL OF A SUBJECT'S DENTITION

(71) Applicant: Align Technology, Inc., San Jose, CA (US)

(72) Inventors: Sergei Popov, Tambov (RU); Vasily Paraketsov, Moscow (RU)

(73) Assignee: Align Technology, Inc., San Jose, CA (US)

( * ) Notice: Subject to any disclaimer, the term of this patent is extended or adjusted under 35 U.S.C. 154(b) by 178 days.

(21) Appl. No.: 18/487,047

(22) Filed: Oct. 14, 2023

(65) Prior Publication Data

US 2024/0122677 A1　Apr. 18, 2024

Related U.S. Application Data

(60) Provisional application No. 63/379,576, filed on Oct. 14, 2022.

(51) Int. Cl.
| | |
|---|---|
| *A61C 7/00* | (2006.01) |
| *A61C 9/00* | (2006.01) |
| *A61C 13/34* | (2006.01) |
| *G06T 7/00* | (2017.01) |
| *G06T 7/73* | (2017.01) |
| *G06T 19/00* | (2011.01) |

(52) U.S. Cl.
CPC ............ *A61C 7/002* (2013.01); *A61C 9/0053* (2013.01); *A61C 13/34* (2013.01); *G06T 7/0014* (2013.01); *G06T 7/74* (2017.01); *G06T*

*19/00* (2013.01); *G06T 2207/20081* (2013.01); *G06T 2207/20084* (2013.01); *G06T 2207/30036* (2013.01); *G06T 2210/41* (2013.01)

(58) Field of Classification Search
CPC .......... A61C 7/002; A61C 9/0053; G06T 7/74
USPC ........................................................ 348/125
See application file for complete search history.

(56) References Cited

U.S. PATENT DOCUMENTS

| | | | |
|---|---|---|---|
| 5,975,893 A | 11/1999 | Chishti et al. | |
| 6,227,850 B1 | 5/2001 | Chishti et al. | |
| 6,227,851 B1 | 5/2001 | Chishti et al. | |
| 6,299,440 B1 | 10/2001 | Phan et al. | |
| 6,318,994 B1 | 11/2001 | Chishti et al. | |
| 6,371,761 B1 | 4/2002 | Cheang et al. | |
| 6,386,878 B1 | 5/2002 | Pavlovskaia et al. | |
| 6,406,292 B1 | 6/2002 | Chishti et al. | |
| 6,409,504 B1 | 6/2002 | Jones et al. | |
| 6,457,972 B1 | 10/2002 | Chishti et al. | |
| 6,488,499 B1 | 12/2002 | Miller | |

(Continued)

*Primary Examiner* — Jeffery A Williams
(74) *Attorney, Agent, or Firm* — Shay Glenn LLP

(57) ABSTRACT

Methods and apparatuses for the automatic determination of the quality of digital three-dimensional (3D) models of a patient's dentition. A virtual 3D model may include multiple regions. A quality determination may include evaluating the virtual 3D model for one or more quality criteria that provide a basis for one or more defect types and for one or more quality measures of the one or more defect types at each of the multiple regions. One or more actions may be performed using the virtual 3D model based on the quality determination, including outputting a description of a risk associated with the one or more quality measures.

38 Claims, 14 Drawing Sheets

(56) References Cited

U.S. PATENT DOCUMENTS

| | | |
|---|---|---|
| 6,514,074 B1 | 2/2003 | Chishti et al. |
| 6,554,611 B2 | 4/2003 | Chishti et al. |
| 6,582,229 B1 | 6/2003 | Miller et al. |
| 6,602,070 B2 | 8/2003 | Miller et al. |
| 6,621,491 B1 | 9/2003 | Baumrind et al. |
| 6,688,886 B2 | 2/2004 | Hughes et al. |
| 6,726,478 B1 | 4/2004 | Isiderio et al. |
| 6,729,876 B2 | 5/2004 | Chishti et al. |
| 6,739,869 B1 | 5/2004 | Taub et al. |
| 6,767,208 B2 | 7/2004 | Kaza |
| 6,783,360 B2 | 8/2004 | Chishti |
| 7,040,896 B2 | 5/2006 | Pavlovskaia et al. |
| 7,063,532 B1 | 6/2006 | Jones et al. |
| 7,074,038 B1 | 7/2006 | Miller |
| 7,074,039 B2 | 7/2006 | Kopelman et al. |
| 7,077,647 B2 | 7/2006 | Choi et al. |
| 7,108,508 B2 | 9/2006 | Hedge et al. |
| 7,134,874 B2 | 11/2006 | Chishti et al. |
| 7,156,661 B2 | 1/2007 | Choi et al. |
| 7,160,107 B2 | 1/2007 | Kopelman et al. |
| 7,241,142 B2 | 7/2007 | Abolfathi et al. |
| 7,293,988 B2 | 11/2007 | Wen |
| 7,309,230 B2 | 12/2007 | Wen |
| 7,357,634 B2 | 4/2008 | Knopp |
| 7,555,403 B2 | 6/2009 | Kopelman et al. |
| 7,637,740 B2 | 12/2009 | Knopp |
| 7,689,398 B2 | 3/2010 | Cheng et al. |
| 7,736,147 B2 | 6/2010 | Kaza et al. |
| 7,746,339 B2 | 6/2010 | Matov et al. |
| 7,844,356 B2 | 11/2010 | Matov et al. |
| 7,844,429 B2 | 11/2010 | Matov et al. |
| 7,865,259 B2 | 1/2011 | Kuo et al. |
| 7,878,804 B2 | 2/2011 | Korytov et al. |
| 7,880,751 B2 | 2/2011 | Kuo et al. |
| 7,904,308 B2 | 3/2011 | Arnone et al. |
| 7,930,189 B2 | 4/2011 | Kuo |
| 7,942,672 B2 | 5/2011 | Kuo |
| 7,970,627 B2 | 6/2011 | Kuo et al. |
| 7,970,628 B2 | 6/2011 | Kuo et al. |
| 8,038,444 B2 | 10/2011 | Kitching et al. |
| 8,044,954 B2 | 10/2011 | Kitching et al. |
| 8,075,306 B2 | 12/2011 | Kitching et al. |
| 8,092,215 B2 | 1/2012 | Stone-Collonge et al. |
| 8,099,268 B2 | 1/2012 | Kitching et al. |
| 8,108,189 B2 | 1/2012 | Chelnokov et al. |
| 8,126,726 B2 | 2/2012 | Matov et al. |
| 8,260,591 B2 | 9/2012 | Kass et al. |
| 8,275,180 B2 | 9/2012 | Kuo |
| 8,401,826 B2 | 3/2013 | Cheng et al. |
| 8,439,672 B2 | 5/2013 | Matov et al. |
| 8,562,338 B2 | 10/2013 | Kitching et al. |
| 8,591,225 B2 | 11/2013 | Wu et al. |
| 8,788,285 B2 | 7/2014 | Kuo |
| 8,843,381 B2 | 9/2014 | Kuo et al. |
| 8,874,452 B2 | 10/2014 | Kuo |
| 8,896,592 B2 | 11/2014 | Boltunov et al. |
| 8,930,219 B2 | 1/2015 | Trosien et al. |
| 9,037,439 B2 | 5/2015 | Kuo et al. |
| 9,060,829 B2 | 6/2015 | Sterental et al. |
| 9,125,709 B2 | 9/2015 | Matty |
| 9,211,166 B2 | 12/2015 | Kuo et al. |
| 9,220,580 B2 | 12/2015 | Borovinskih et al. |
| 9,364,296 B2 | 6/2016 | Kuo |
| 9,375,300 B2 | 6/2016 | Matov et al. |
| 9,414,897 B2 | 8/2016 | Wu et al. |
| 9,492,245 B2 | 11/2016 | Sherwood et al. |
| 9,642,678 B2 | 5/2017 | Kuo |
| 10,248,883 B2 | 4/2019 | Borovinskih et al. |
| 10,342,638 B2 | 7/2019 | Kitching et al. |
| 10,463,452 B2 | 11/2019 | Matov et al. |
| 10,595,966 B2 | 3/2020 | Carrier, Jr. et al. |
| 10,617,489 B2 | 4/2020 | Grove et al. |
| 10,722,328 B2 | 7/2020 | Velazquez et al. |
| 10,758,322 B2 | 9/2020 | Pokotilov et al. |
| 10,779,718 B2 | 9/2020 | Meyer et al. |
| 10,792,127 B2 | 10/2020 | Kopelman et al. |
| 10,828,130 B2 | 11/2020 | Pokotilov et al. |
| 10,835,349 B2 | 11/2020 | Cramer et al. |
| 10,973,611 B2 | 4/2021 | Pokotilov et al. |
| 10,996,813 B2 | 5/2021 | Makarenkova et al. |
| 10,997,727 B2 | 5/2021 | Xue et al. |
| 11,020,205 B2 | 6/2021 | Li et al. |
| 11,020,206 B2 | 6/2021 | Shi et al. |
| 11,026,766 B2 | 6/2021 | Chekh et al. |
| 11,033,359 B2 | 6/2021 | Velazquez et al. |
| 11,071,608 B2 | 7/2021 | Derakhshan et al. |
| 11,096,763 B2 | 8/2021 | Akopov et al. |
| 11,116,605 B2 | 9/2021 | Nyukhtikov et al. |
| 11,147,652 B2 | 10/2021 | Mason et al. |
| 11,151,753 B2 | 10/2021 | Gao et al. |
| 11,154,381 B2 | 10/2021 | Roschin et al. |
| 11,259,896 B2 | 3/2022 | Matov et al. |
| 11,357,598 B2 | 6/2022 | Cramer |
| 11,395,717 B2 | 7/2022 | Yuryev et al. |
| 11,432,908 B2 | 9/2022 | Kopelman et al. |
| 11,464,604 B2 | 10/2022 | Makarenkova et al. |
| 11,478,334 B2 | 10/2022 | Matov et al. |
| 11,484,389 B2 | 11/2022 | Sterental et al. |
| 11,521,732 B2 | 12/2022 | Levin et al. |
| 11,534,272 B2 | 12/2022 | Li et al. |
| 11,553,988 B2 | 1/2023 | Mednikov et al. |
| 11,633,268 B2 | 4/2023 | Moalem et al. |
| 11,642,195 B2 | 5/2023 | Gao et al. |
| 11,651,494 B2 | 5/2023 | Brown et al. |
| 11,654,001 B2 | 5/2023 | Roschin et al. |
| 11,707,344 B2 | 7/2023 | Roschin et al. |
| 11,810,271 B2 | 11/2023 | Shi et al. |
| 11,850,111 B2 | 12/2023 | Derakhshan et al. |
| 2003/0008259 A1 | 1/2003 | Kuo et al. |
| 2003/0143509 A1 | 7/2003 | Kopelman et al. |
| 2003/0207227 A1 | 11/2003 | Abolfathi |
| 2004/0137400 A1 | 7/2004 | Chishti et al. |
| 2004/0152036 A1 | 8/2004 | Abolfathi |
| 2004/0197728 A1 | 10/2004 | Abolfathi et al. |
| 2004/0259049 A1 | 12/2004 | Kopelman et al. |
| 2005/0182654 A1 | 8/2005 | Abolfathi et al. |
| 2005/0244791 A1 | 11/2005 | Davis et al. |
| 2006/0127836 A1 | 6/2006 | Wen |
| 2006/0127852 A1 | 6/2006 | Wen |
| 2006/0127854 A1 | 6/2006 | Wen |
| 2006/0275731 A1 | 12/2006 | Wen et al. |
| 2006/0275736 A1 | 12/2006 | Wen et al. |
| 2008/0306724 A1 | 12/2008 | Kitching et al. |
| 2010/0009308 A1 | 1/2010 | Wen et al. |
| 2010/0068672 A1 | 3/2010 | Arjomand et al. |
| 2010/0068676 A1 | 3/2010 | Mason et al. |
| 2010/0092907 A1 | 4/2010 | Knopp |
| 2010/0167243 A1 | 7/2010 | Spiridonov et al. |
| 2013/0204599 A1 | 8/2013 | Matov et al. |
| 2017/0273760 A1 | 9/2017 | Morton et al. |
| 2018/0028065 A1* | 2/2018 | Elbaz ................. G06F 16/9535 |
| 2018/0280118 A1 | 10/2018 | Cramer |
| 2019/0328487 A1 | 10/2019 | Levin et al. |
| 2019/0328488 A1 | 10/2019 | Levin et al. |
| 2020/0155274 A1 | 5/2020 | Pimenov et al. |
| 2020/0160497 A1* | 5/2020 | Shah ........................ G06T 7/13 |
| 2020/0297458 A1 | 9/2020 | Roschin et al. |
| 2020/0306011 A1 | 10/2020 | Chekhonin et al. |
| 2021/0059796 A1* | 3/2021 | Weiss .................. A61C 9/0053 |
| 2021/0134436 A1 | 5/2021 | Meyer et al. |

* cited by examiner

250

Receiving a virtual 3D model
252

Generate a score of the virtual 3D model of the patient's dentition
254

Apply a trained neural network (trained on flaws scored specific to the treatment/treatment plan type
256

Process the virtual 3D model based on the score outcome (e.g., reject, modify, accept)
258

Generate treatment plan with virtual 3D model if score indicates fitness
260

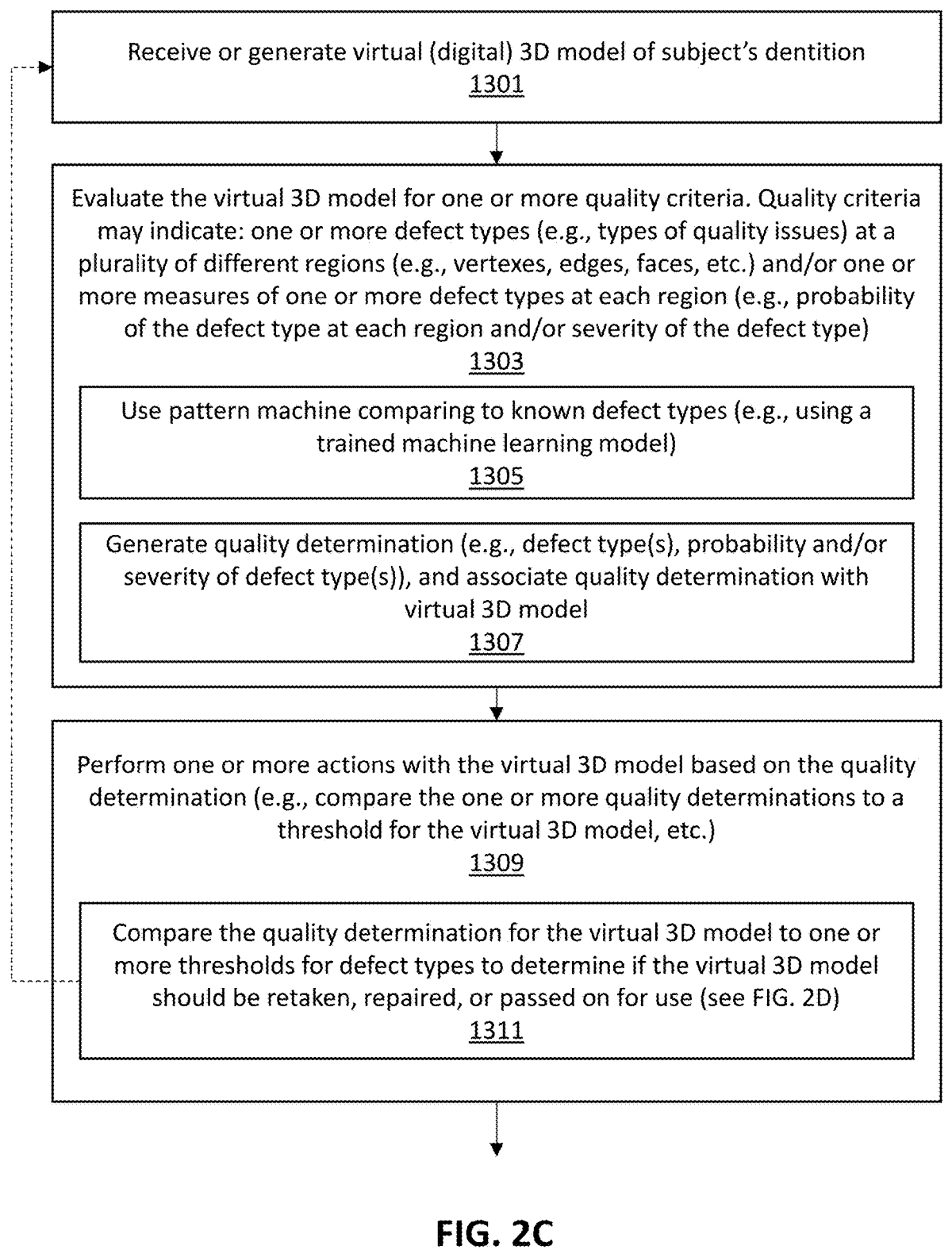

Receive or generate virtual (digital) 3D model of subject's dentition
1301

Evaluate the virtual 3D model for one or more quality criteria. Quality criteria may indicate: one or more defect types (e.g., types of quality issues) at a plurality of different regions (e.g., vertexes, edges, faces, etc.) and/or one or more measures of one or more defect types at each region (e.g., probability of the defect type at each region and/or severity of the defect type)
1303

Use pattern machine comparing to known defect types (e.g., using a trained machine learning model)
1305

Generate quality determination (e.g., defect type(s), probability and/or severity of defect type(s)), and associate quality determination with virtual 3D model
1307

Perform one or more actions with the virtual 3D model based on the quality determination (e.g., compare the one or more quality determinations to a threshold for the virtual 3D model, etc.)
1309

Compare the quality determination for the virtual 3D model to one or more thresholds for defect types to determine if the virtual 3D model should be retaken, repaired, or passed on for use (see FIG. 2D)
1311

FIG. 2C

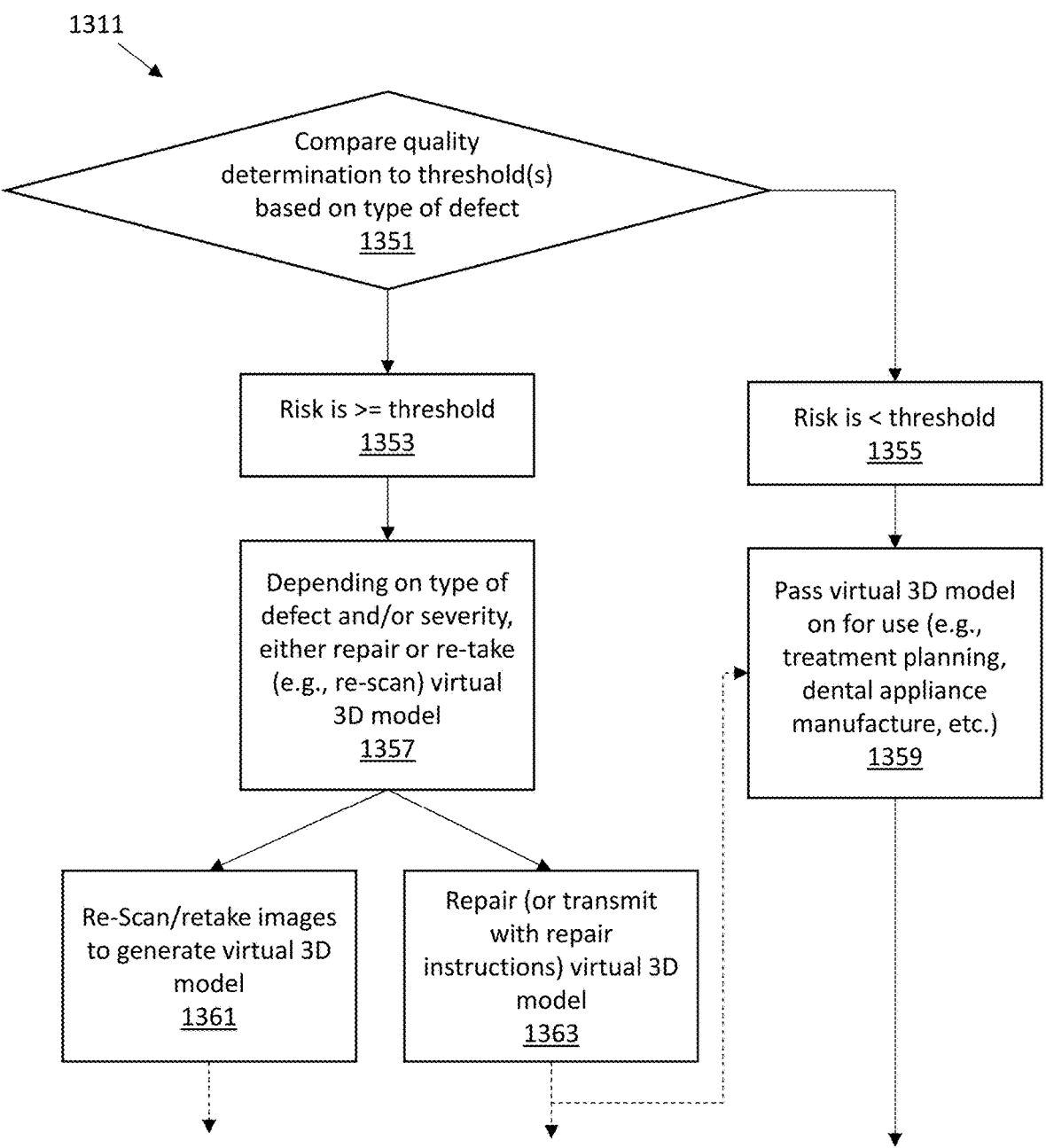

1311

Compare quality
determination to threshold(s)
based on type of defect
1351

Risk is >= threshold
1353

Risk is < threshold
1355

Depending on type of
defect and/or severity,
either repair or re-take
(e.g., re-scan) virtual
3D model
1357

Pass virtual 3D model
on for use (e.g.,
treatment planning,
dental appliance
manufacture, etc.)
1359

Re-Scan/retake images
to generate virtual 3D
model
1361

Repair (or transmit
with repair
instructions) virtual 3D
model
1363

FIG. 2D

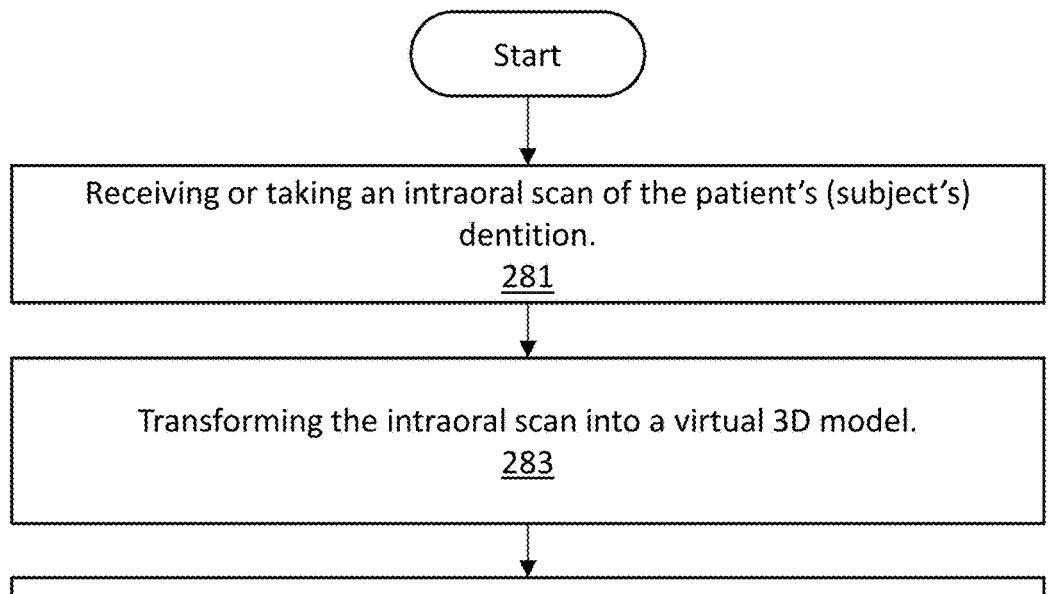

Start

Receiving or taking an intraoral scan of the patient's (subject's) dentition.
281

Transforming the intraoral scan into a virtual 3D model.
283

Performing a quality determination for the virtual 3D model by evaluating the virtual 3D model for one or more quality criteria, wherein the one or more quality criteria provide a basis for one or more defect types and for one or more measures of the one or more defect types at each of the plurality of regions.
285

Performing one or more actions using the virtual 3D model based on the quality determination.
287

Identifying a target position and a plurality of intermediate arrangements (corresponding to a treatment plan)
289

Using the plurality of intermediate arrangements to form a series of dental appliances.
291

End

FIG. 2F

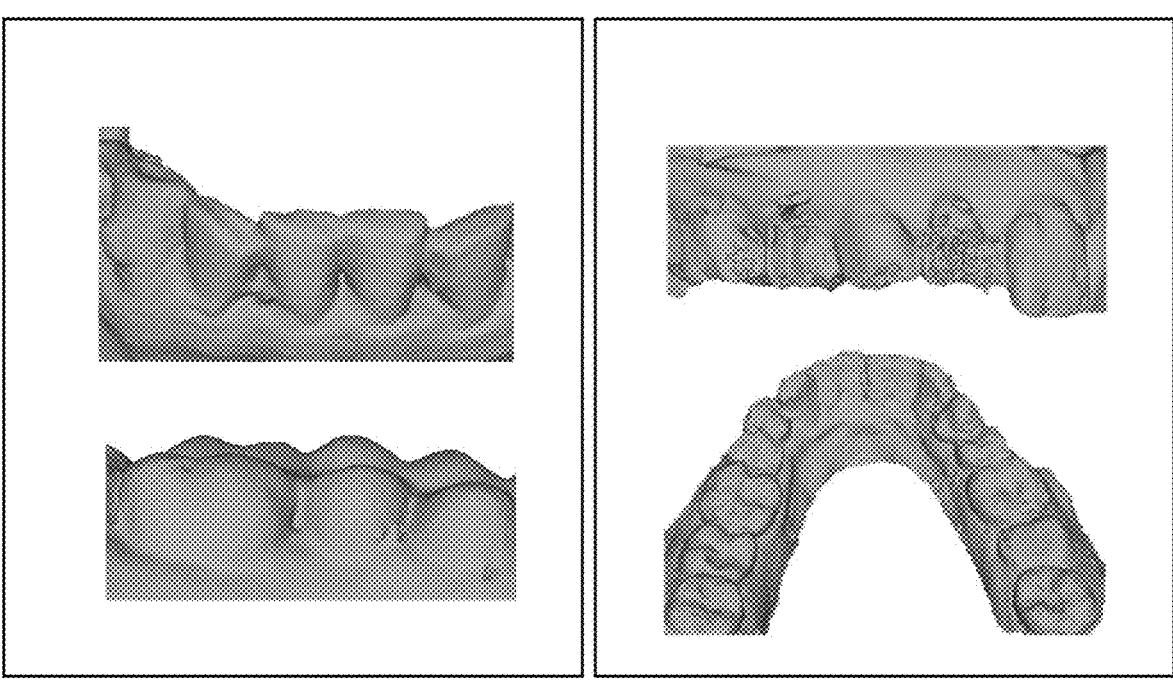
FIG. 4A                    FIG. 4B
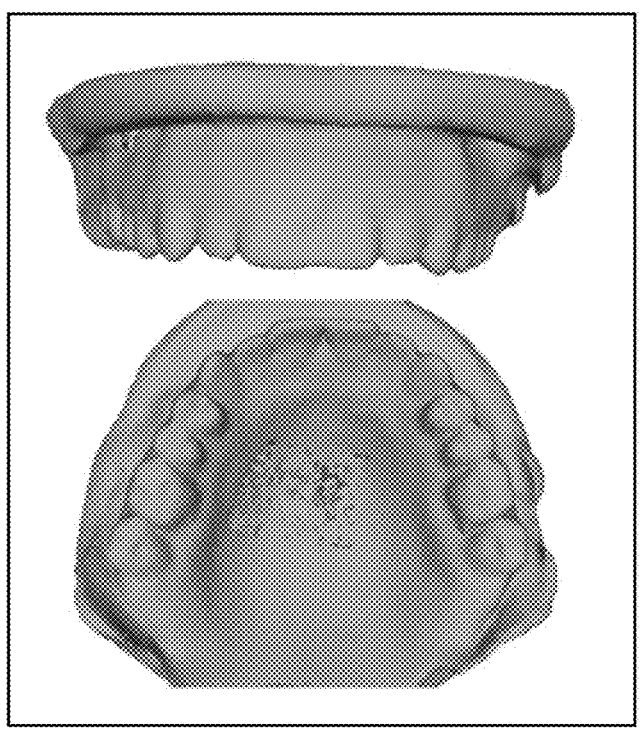
FIG. 5

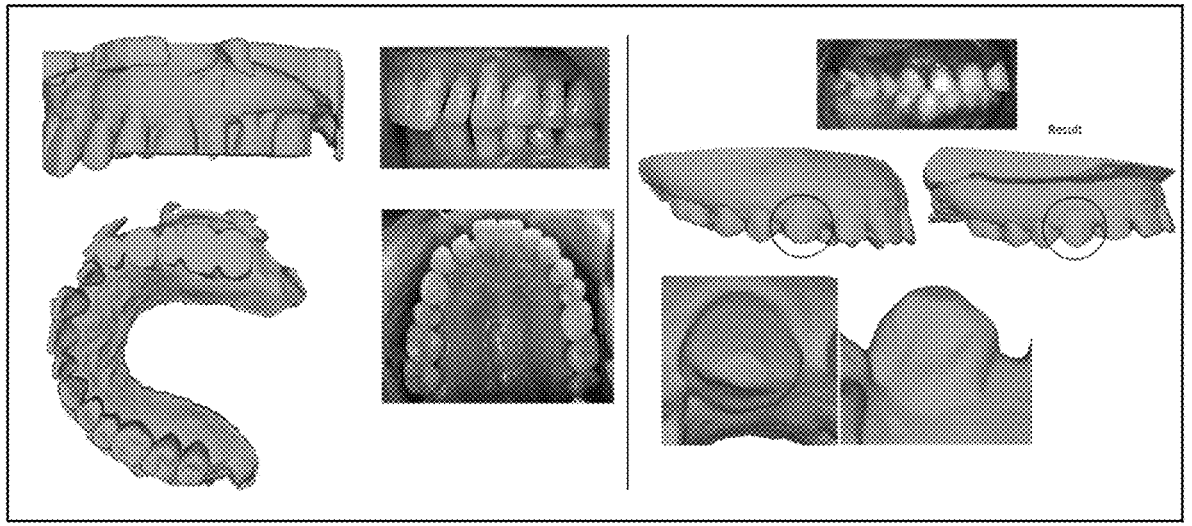
FIG. 12A                                    FIG. 12B

METHODS AND APPARATUSES FOR PREPARING A VIRTUAL THREE-DIMENSIONAL MODEL OF A SUBJECT'S DENTITION

CLAIM OF PRIORITY

This patent application claims priority to U.S. Provisional Patent Application No. 63/379,576, titled "AUTOMATIC DETECTION AND PROCESSING OF POOR-QUALITY VIRTUAL THREE-DIMENSIONAL DENTAL MODELS," filed on Oct. 14, 2022, herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

BACKGROUND

The accuracy of digital scans (e.g., intraoral scans) used to generate three-dimensional (3D) digital models may be of particular importance when the resulting 3D digital models are used for dental and/or orthodontic treatment planning. For example, the use of one or more digital models of a patient's dentition may be helpful when designing a series of aligners (e.g., "shells") that may be used to align the patient's teeth, when expanding a patient's dental arch (e.g., palatal expansion) and/or when designing pontics. In such cases, the more accurate and complete the 3D digital model is, the more reliable and effective the actual patient treatment may be.

Traditionally, the digital scan is analyzed manually or primarily manually, by a technician diether during the scanning process, or afterwards. However, there are many different factors that may inform the quality of the 3D model derived from one or more scans and may impact the ability of the scan to be used for accurate and effective treatment planning. In some cases, these factors are not visually apparent, thus it may be difficult and/or time consuming to rely on manual review of 3D dental models. What is needed is methods and apparatuses for preforming and/or simplifying the automatic detection of the quality of digital (e.g., virtual) 3D dental models relative to the 3D dental models use during treatment planning.

SUMMARY OF THE DISCLOSURE

Described herein are method and apparatuses for the automatic determination of the quality of a digital three-dimensional (3D) models of a patient's dentition. In particular, described herein are methods and apparatuses for determining the if a digital 3D model is of sufficient quality for use in treatment planning. These methods and apparatuses (e.g., devices, systems, etc. including in particular software, firmware and/or hardware) may use a machine learning agent (e.g., neural network, etc.) that is trained using a set of defects that are specific to the quality and/or utility of the digital 3D model specific to treatment planning. The machine learning agent may therefore be capable of identifying defects that are not apparent (or not readily apparent) to a visual observer.

As used herein, treatment planning may include planning one or more treatments for aligning a patient's teeth (e.g., using a series of removable aligners, including shell aligners). In some examples, treatment planning may include planning one or more treatments for expanding a patient's dental arch (e.g., palatal expansion). In some examples, treatment planning may include treatments for making and/or applying a dental implant (e.g., cap, veneer, pontic, etc.).

For example, described herein are methods for preparing a virtual three-dimensional (3D) model that include: receiving a virtual 3D model of a person's dentition, wherein the virtual 3D model comprises a plurality of regions; performing a quality determination for the virtual 3D model by evaluating the virtual 3D model for one or more quality criteria, wherein the one or more quality criteria provide a basis for one or more defect types and for one or more measures of the one or more defect types at each of the plurality of regions; and performing one or more actions using the virtual 3D model based on the quality determination.

A quality determination indicates the overall quality, or fitness, of the virtual 3D model. In some cases the quality determination indicates the fitness of the virtual 3D model for a guiding or assisting in particular dental goal associated with a treatment plan. This may include the fitness for generating the treatment plan, and/or designing and/or fabrication of one or more dental appliances for use in achieving the dental treatment. For example, the quality determination may provide information, including quality criteria, indicating the severity (and in some cases the location and/or extent of) one or more defects of a scan such as holes, missed teeth (e.g., molars, etc.), scanner software errors (e.g., stitching, RTM, low resolution, etc.), poor impressions (e.g., wrong material used, stretching of material once removed, air bubbles, etc.). the quality determination may be output as a score or indicator (e.g., numeric, alphanumeric, etc.) and may be specific to the intended treatment(s), which may be predetermined or specified, including selected by a user from a menu of treatment types (e.g., correction of malocclusion of teeth, palatal expansion, overbite, tooth implant, pontics, etc. Quality criterion may be pre-determined and/or may be modified, e.g., by training a machine learning system.

In general, a quality criterion may include standards for one or more characteristics of the virtual 3D model that may be relevant to the ability of the virtual model to accurately represent the subject's dental arch(es), particularly with respect to generating a treatment plan and/or dental appliance for accomplishing a treatment plan. As mentioned, the quality criteria may provide a basis for one or more defect types and for one or more measures of the one or more defect types at each of the plurality of regions. The measures of the one or more defect types may include a numeric value, including a probability of a defect and/or a severity of a defect. In some cases the measures may be an array of values that may include a type of defect, the probability of the defect being present, and/or an indicator of the severity of the defect. Multiple measures may be determined, corresponding to multiple defects, for each virtual 3D model. The measures may be taken by analyzing multiple different regions of the virtual 3D model, however, in some cases the measures may be aggregated or averaged.

As used herein, the one or more action may generally include actions base on the results of the assessment of the quality of the scan. The actions may be specific to the intended or corresponding treatment. For example, the actions may include retaking the scan, modifying (e.g., correcting) the scan, and/or using the scan for the treatment. Modification of the scan may be based on the results of the measures.

For example, performing the one or more actions comprises performing the one or more actions after comparing the quality determination to a quality threshold for the virtual 3D model. In any of these examples, the plurality of regions may comprise: one or more of: vertices of the 3D model, edges of the 3D model, and/or faces of the 3D model. In some examples, the one or more measures of the one or more defect types may include one or more probabilities of known defect types at each of the plurality of regions. As used herein known defect types may include types of scan defects, such as, for example, gaps/holes in the scan, missing surface regions, extra material, stitching defects (when stitching together multiple 2D scans to form the virtual 3D scan), etc.

In general, evaluating the 3D model for one or more quality criteria may include evaluating patterns in each of the plurality of regions against patterns in training 3D models in a training dataset having known defect types. For example, evaluating patterns in the plurality of regions against patterns in the training 3D models comprises performing image classification on the 3D model. Evaluating the 3D model for one or more quality criteria may comprise evaluating the plurality of regions for probabilities of known defect types. In general, and as described herein, evaluating the 3D model for one or more quality criteria may include using a machine learning model trained to evaluate patterns in the one or more regions against patterns in training dataset of 3D models with known defect types. In general, the term "machine learning" is intended to be general, and may include any type of machine learning, performed by any appropriate machine learning agent(s). For example, machine learning may include deep learning, artificial neural networks (neural networks), supervised learning, semi-supervised, unsupervised learning, and/or reinforcement learning. Any type of machine learning may be used, including (but not limited to): association rule learning, neural networks, decision trees, support-vector networks, regression analysis, Bayesian networks, gaussian process regression, genetic algorithms, etc. In some examples the machine learning model may comprise a neural network. The machine learning agent may be trained, e.g., using a training data set as described herein. For example, a machine learning model may be trained to perform image classification on the training dataset of 3D models. The plurality of regions may comprise one or more of: vertices of the 3D model, edges of the 3D model, and/or faces of the 3D model.

The one or more quality criteria may provide a basis for scan errors due to a mix of primary and permanent teeth in the person's dentition. In some examples, the one or more quality criteria provide a basis for scan errors due to thinly scanned edges in a scan of the person's dentition. The one or more quality criteria may provide a basis for scan errors due to blending of teeth and gingiva in a scan of the person's dentition. In some examples the one or more quality criteria provide a basis for scan errors due to excess material errors in a scan of the person's dentition.

In any of these methods and apparatuses, performing one or more actions using the virtual 3D model may be based on the quality determination comprises providing instructions whether or not the 3D model crosses the quality threshold. Performing one or more actions using the virtual 3D model may be based on the quality determination comprises generating a treatment plan using the virtual 3D model. In any of these methods and apparatuses, performing one or more actions using the virtual 3D model may be based on the quality determination comprises providing a treatment plan using the virtual 3D model for manual quality inspection. For example, performing one or more actions using the virtual 3D model may be based on the quality determination comprises modifying the virtual 3D model to correct one or more defects.

In some cases performing one or more actions using the virtual 3D model may be based on the quality determination comprises outputting a description of a defect associated with the quality measure. Performing one or more actions using the virtual 3D model may be based on the quality determination comprises providing a screenshot of a defect associated with the quality measure. In some examples performing one or more actions using the virtual 3D model based on the quality determination comprises outputting a description of a risk associated with the quality measure. In some examples performing one or more actions using the virtual 3D model based on the quality determination comprises outputting a numerical description of a risk associated with the quality measure. Performing one or more actions using the virtual 3D model based on the quality determination may comprise using the virtual 3D model to identify an initial position of the persons' dentition.

Any of these methods may include identifying a target position and a plurality of intermediate arrangements to move the person's dentition from the initial position toward the target position. For example, any of these methods may include using the plurality of intermediate arrangements to identify a series of dental appliances to implement the treatment plan. The series of dental appliances may include a series of aligners, a series of palatal expanders, or some combination thereof.

In general, performing one or more actions using the virtual 3D model based on the quality determination may include accepting or rejecting the patient's dentition for treatment planning based on the quality determination. Performing one or more actions using the virtual 3D model based on the quality determination may include rescanning the person's dentition. Any of these methods may include transforming the intraoral scan into a new virtual 3D model.

In general, these methods may be configured to be performed by an intraoral scanner. An intraoral scanner may produce a virtual 3D model of the patient's dentition, which may be a 3D mesh model. For example, performing the one or more actions using the virtual 3D model based on the quality determination may include outputting instructions to a user of the intraoral scanner that the virtual 3D model has significant defects and/or is considered risky and/or is likely to adversely affect treatment quality. Performing the one or more actions using the virtual 3D model based on the quality determination may include outputting instructions to fabricate one or more dental appliances using the 3D model.

Performing the one or more actions using the virtual 3D model based on the quality determination may include fabricating one or more dental appliances using the 3D model. herein the one or more dental appliances comprise a series of aligners. The one or more dental appliances may comprise one or more of: one or more palatal expanders, one or more dental appliances, one or more restorations and/or one or more implants.

Also described herein are systems that are configured to perform any of these methods. For example, a system may include: one or more processors; a memory coupled to the one or more processors and configured to store computer-program instructions, that when executed by the one or more processors, cause the system to perform: receiving a virtual 3D model of a person's dentition, wherein the virtual 3D model comprises a plurality of regions; performing a quality determination for the virtual 3D model by evaluating the virtual 3D model for one or more quality criteria, wherein the one or more quality criteria provide a basis for one or more defect types and for one or more measures of the one or more defect types at each of the plurality of regions; and performing one or more actions using the virtual 3D model based on the quality determination. As mentioned above, any of systems may include or may be an intraoral scanner (e.g., intraoral scanning systems) and may include all or some of the components of an intraoral scanner, including an imaging component, such as a wand, camera, etc., one or more light sources (which may be part of, or integrated with, the imaging component), image processing (lenses, filters, etc.), memory, one or more processors, etc.

For example, a system may include: an v scanner comprising a light source and optics configured to capture images of a person's dentition; one or more processors configured to generate a virtual 3D model of the person's dentition from the captured images; and a memory coupled to the one or more processors and configured to store computer-program instructions, that when executed by the one or more processors, cause the system to perform: receiving a virtual 3D model of a person's dentition, wherein the virtual 3D model comprises a plurality of regions; performing a quality determination for the virtual 3D model by evaluating the virtual 3D model for one or more quality criteria, wherein the one or more quality criteria provide a basis for one or more defect types and for one or more measures of the one or more defect types at each of the plurality of regions; and performing one or more actions using the virtual 3D model based on the quality determination.

Also described herein are method of assessing a fitness of a virtual three-dimensional (3D) model of a patient's dentition for generating a treatment plan, systems configured to perform these methods, and software (e.g., non-transitory computer-readable storage medium storing instructions) for performing these methods. For example, described herein are methods of assessing a fitness of a virtual three-dimensional (3D) model of a patient's dentition for generating a treatment plan comprising: receiving a virtual 3D model of the patient's dentition; generating a score of the virtual 3D model of the patient's dentition using a trained neural network, wherein the trained neural network is trained using a plurality of virtual 3D models having one or more flaws that are scored specific to a type of dental treatment effected by the treatment plan; and outputting the score of the virtual 3D model.

In some examples the methods may include: receiving a virtual 3D model of the patient's dentition; generating a score of the virtual 3D model of the patient's dentition using a trained neural network, wherein the trained neural network is trained using a plurality of virtual 3D models having one or more flaws that are scored specific to a type of dental treatment effected by the treatment plan; if the score indicates that the virtual 3D model is of sufficient quality, generating the treatment plan using the virtual 3D model based on the score of the virtual 3D model, otherwise rejecting the virtual 3D model.

These methods and apparatuses may be used to assess the fitness of a virtual 3D model for any appropriate type of treatment (and thus, any type of treatment plan). For example, the type of the treatment plan may comprise a series of dental aligners for incrementally moving teeth. The type of treatment plan may be a sub-type of treatment including removable (shell) dental aligners, such as treatment plans specific to particular orthodontic procedures (e.g., moving certain teeth, or certain types of orthodontic corrections such as tooth straightening, bite alignment, jaw alignment, etc.). For example, the type of treatment plan may comprise a dental implant (e.g., bridge, veneer, etc.). In some examples the type of treatment plan comprises a palatal expansion.

These methods and apparatuses may be trained to recognize any type of flaw or flaws. For example, the one or more flaws may include one or more of: missing anatomy (teeth, gingiva, etc.), excess material (holes, etc.), clipping, bubbles, tray extraction, louvering, artificial step transitions, over smoothing, and noise.

In general, the score generated by the trained neural network may be quantified score (e.g., a numeric value between 0 and 1, between 0 and 100, a percentage, etc.), and/or a qualified score (e.g., "good," "intermediate," "bad", etc.). In any of these methods and apparatuses, the score generated may be compared to a threshold valve for the type of treatment procedure. For example, the score may be compared to a threshold valve; in some examples the threshold value may be specific to the type of treatment.

Outputting the score may include outputting the qualitative or quantitative score, and/or it may include outputting an indicator of the score (e.g., color scale, graphical indicator, etc.). In some examples, outputting the score comprises outputting the consequence of the score, such as rejecting the virtual 3D model, indicating that the virtual 3D model requires correction, and/or accepting the virtual 3D model.

Any of these methods and apparatuses described herein may include annotating the virtual 3D model as part of, or in addition to, the scoring. For example, any of these methods may include indicating where on the virtual 3D model corrections should be made to correct the virtual 3D model. The trained neural network may be trained to identify potentially problematic regions specific to a type of treatment (and therefore for a specific treatment plan).

Any of the methods and apparatuses described herein may be configured to provide output (e.g., as part of the outputting step) instructing a user (e.g., technician, dentist, orthodontist, etc.) to use or not to use the virtual 3D model of the patient's dentition for treatment planning based on the score of the virtual 3D model. In any of these methods and apparatuses, outputting may include instructing a user to modify the virtual 3D model before using it the treatment plan. As mentioned, outputting may include outputting comments and/or annotations on the virtual 3D model.

Any of these methods and apparatuses may automatically or semi-automatically pass on virtual 3D models that are found (by the automated agent) to be of sufficient quality for use in treatment planning for the particular treatment being considered. For example, outputting may include generating the treatment plan using the virtual 3D model based on the score of the virtual 3D model. In some examples, the method or apparatus may not include explicitly presenting the scoring. In some examples, the method or apparatus may automatically generate a treatment plan (directly or by transmitting to a separate treatment planning engine). In any of these examples the method or apparatus may output the treatment plan.

The methods and apparatuses described herein may be part of, or included with, a scanner (e.g., an intraoral scanner) for scanning a patient's dentition, and generating the virtual 3D model. For example, a method may include creating a virtual 3D model from scans of the patient's dentition.

As mentioned, any of the methods described above may performed by an apparatus. For example, described herein are apparatuses that include: one or more processors; and a memory storing instructions that, when executed by the one or more processors, causes the one or more processor to perform a method comprising: receiving a virtual 3D model of a patient's dentition (e.g., using virtual 3D model receiving module); generating a score of the virtual 3D model of the patient's dentition using a trained neural network (e.g., using a scoring module), wherein the trained neural network is trained using a plurality of virtual 3D models having one or more flaws that are scored specific to a type of dental treatment effected by a treatment plan; and outputting (e.g., using an output module) the score of the virtual 3D model for the treatment plan.

In some examples the apparatus may include: one or more processors; and a memory storing instructions that, when executed by the one or more processors, causes the one or more processor to perform a method comprising: receiving (e.g., using a receiving module) a virtual 3D model of the patient's dentition; generating a score (using a scoring module) of the virtual 3D model of a patient's dentition using a trained neural network, wherein the trained neural network is trained using a plurality of virtual 3D models having one or more flaws that are scored specific to a type of dental treatment effected by a treatment plan; and if the score indicates that the virtual 3D model is of sufficient quality, generating the treatment plan using the virtual 3D model based on the score of the virtual 3D model (e.g., using a treatment planning engine). The scoring module may include or couple to the trained machine learning agent.

As mentioned, also described herein is software configured to perform any of these methods. For example, the software may include a non-transitory computer-readable storage medium storing instructions that, when executed by one or more processors of a device, cause the one or more processors to perform a method comprising: receiving a virtual 3D model of the patient's dentition; generating a score of the virtual 3D model of a patient's dentition using a trained neural network, wherein the trained neural network is trained using a plurality of virtual 3D models having one or more flaws that are scored specific to a type of dental treatment effected by a treatment plan; and outputting the score of the virtual 3D model specific to the treatment plan.

In some examples a non-transitory computer-readable storage medium storing instructions that, when executed by one or more processors of a device, cause the one or more processors to perform a method comprising: receiving a virtual 3D model of the patient's dentition; generating a score of the virtual 3D model of a patient's dentition using a trained neural network, wherein the trained neural network is trained using a plurality of virtual 3D models having one or more flaws that are scored specific to a type of dental treatment effected by a treatment plan; and if the score indicates that the virtual 3D model is of sufficient quality, generating the treatment plan using the virtual 3D model based on the score of the virtual 3D model.

All of the methods and apparatuses described herein, in any combination, are herein contemplated and can be used to achieve the benefits as described herein.

BRIEF DESCRIPTION OF THE DRAWINGS

A better understanding of the features and advantages of the methods and apparatuses described herein will be obtained by reference to the following detailed description that sets forth illustrative embodiments, and the accompanying drawings of which:

FIG. 2C schematically illustrates an example of a method of preparing a virtual three-dimensional (3D) model.

FIG. 2D illustrates an examples of a module for comparing the quality determination for a virtual 3D model to one or more thresholds for defect types to determine if the virtual 3D model should be retaken, repaired, or passed on for use.

FIG. 2F shows an example of a method of preparing a virtual three-dimensional (3D) model including assessing the quality of a virtual 3D model.

FIG. 3A shows an example of a virtual 3D scan showing missed anatomy. FIG. 3A shows an example of missing anatomy. FIG. 3B shows an example of edges that are too thin. FIG. 3C shows an example of blended tooth and gingiva. FIG. 3D shows an example with excess material scanned.

FIGS. 4A-4B shows examples virtual 3D scans having noise (noise flaws). FIG. 4A shows virtual 3D scans having higher scores while FIG. 4B shows virtual 3D scans having lower scores.

FIG. 5 shows an example of virtual 3D scans that are overly smooth flaws, potentially resulting in low scores by the trained machine learning agent.

FIG. 8A shows a virtual 3D scan likely having a higher score, while FIG. 8B shows virtual 3D scans likely having lower scores.

FIG. 9A shows virtual 3D scans likely having higher scores, while FIG. 9B shows virtual 3D scans likely having lower scores.

FIG. 10A shows a virtual 3D scan likely having a higher score, while FIG. 10B shows virtual 3D scans likely having lower scores.

FIG. 11A shows virtual 3D scans likely having higher scores, while FIG. 11B shows virtual 3D scans likely having lower scores.

FIGS. 12A-12B show examples of virtual 3D scans having clipping flaws.

DETAILED DESCRIPTION

Figure 1:
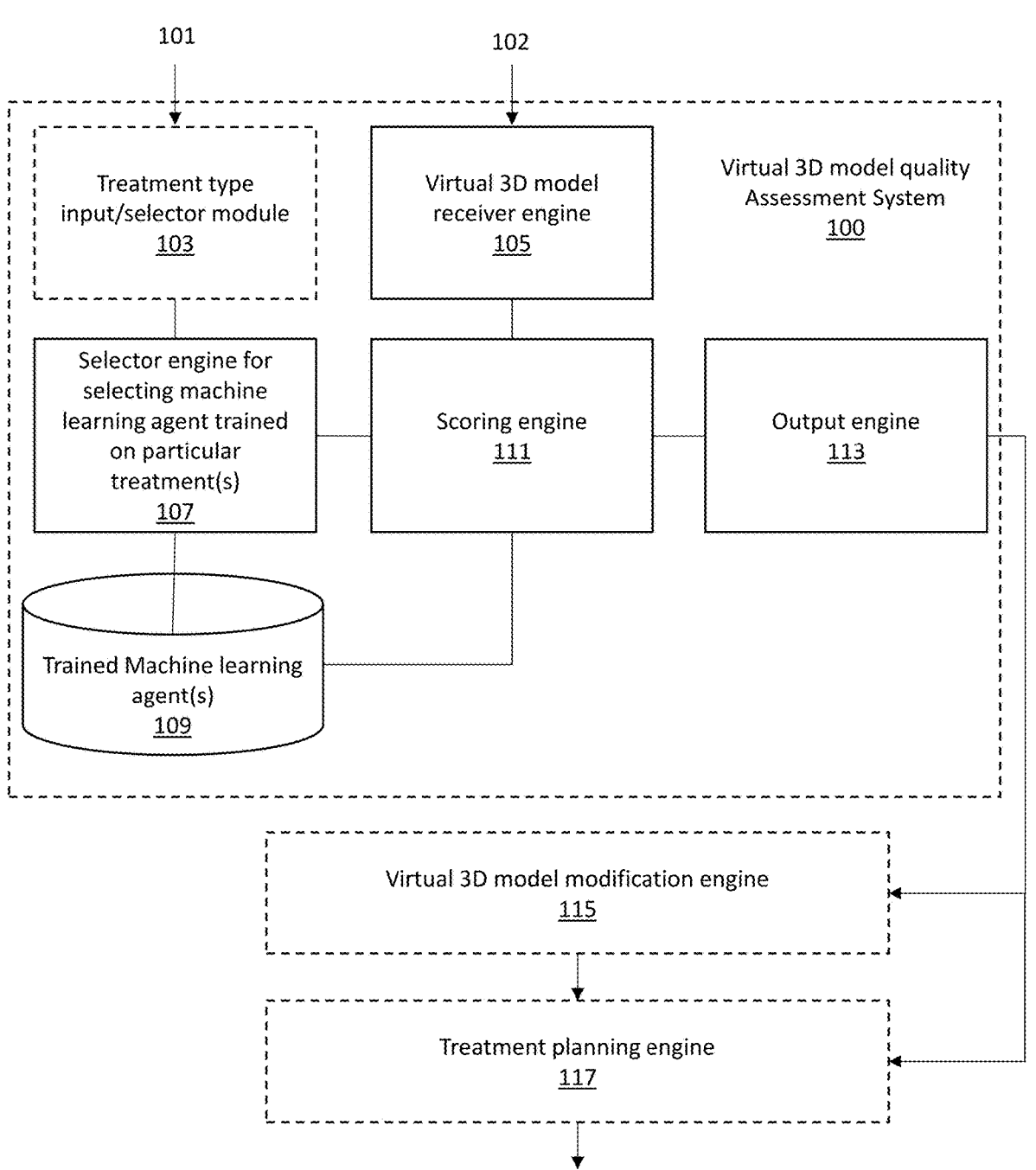
FIG. 1 schematically illustrates one example an apparatus for assessing the quality of a virtual three-dimensional (3D) model.

Virtual (e.g., digital) three-dimensional (3D) models may be used for modeling a patient's dentition, including the patient's upper and/or lower dental arch, and in particular may be used for preparing a treatment plan to treat the patient's dental arch. Virtual 3D models that are of poor quality may not allow treatment planning at all, or may result in poor-quality treatment plans, particularly in dental treatment planning in which the patient's teeth are moved and/or modified. For example this may be true where the treatment being planning includes one or a series of dental aligners to be used to modify the position(s) of the patient's teeth. Systems of dental appliances (e.g., "aligners") are described, for example, in U.S. Pat. No. 5,975,893 and are commercially available from Align Technology, Inc., Santa Clara, Calif., under the tradename, Invisalign System. Throughout the description herein, the use of the terms "orthodontic aligner", "aligner", or "dental aligner" is synonymous with the use of the terms "appliance" and "dental appliance" in terms of dental applications. However, it should be understood that the term "dental appliances" may also include appliances other than aligners, including expanders (e.g., palatal expanders), implant (e.g., pontics, veneers, etc.). and the like.

For example, poor quality digital scans and/or 3D digital models of the patient's teeth may inaccurately model the patient's teeth and may subsequently increase the risk of a fit issue or the risk of the treatment plan failing to meet its goals.

There are different types of errors or flaws that may negatively implant the ability of a digital 3D model in treatment planning. Different types of errors or flaws in a digital 3D model may include those related to poor scanning techniques (e.g. holes, missed molars, etc.), scanner software errors (e.g. stitching, RTM, low resolution, etc.), poor impressions (e.g. wrong material used, stretching of material once removed, air bubbles, etc.), and the like. Examples of such errors or flaws may include: clipping, bubbles (e.g., hidden bubbles), missing data, tray extraction, louvering, artificial or step transitions, over smoothing, and noise.

Further, not all errors or flaws are equally impactful. In particular, the location and extent of the error may be important. As described herein, in some cases certain types of errors or flaws, and/or the locations of the errors or flaws, may be more important for certain types of treatment planning. Thus, described herein are methods and apparatuses that my select the weighting and/or in some cases the trained machine-learning agent used to detect the error or flaw, which may be based at least in part on the category of treatment plan to be used with the digital 3D model.

The methods and apparatuses described herein may allow automatic determination of if the quality of a digital 3D model is appropriate for planning a particular treatment (e.g., dental and/or orthodontic treatment). These method and apparatuses may assist a user (e.g., technician, dentist, orthodontist, etc.) in determining if a digital 3D model is so flawed or broken that it should be rejected, or in some examples if it could be repaired, or alternatively or additionally, if it may be used without requiring repair or rejection. These methods and apparatuses may fully automate or may partially automate the quality determination of a digital 3D model of a patient's dentition (e.g., teeth, gingiva, palate, etc.). These methods and apparatuses may improve both the detection of subtle errors of flaws that may negatively impact a particular treatment plan or type of treatment plan. The methods an apparatuses described herein may also or alternatively determine that a visibly flawed digital 3D model may still be used for a particular treatment plan or type of treatment plan without requiring rejection and/or repair of the digital 3D model.

Described herein are methods to automate quality check and automatically pass or reject a 3D digital model (or a scan/impression used to form a 3D digital model). These methods and apparatuses may therefore reduce the amount of resources spent on manual quality check and reduce or prevent fit issues and/or the likelihood of treatment plans failing to reach their goals.

For example, FIG. 1 illustrate one example of an apparatus for assessing the quality (e.g., scoring) a virtual 3D model of a patient's dentition relative to a particular dental treatment. In this example, the apparatus may include one or more processors and one or more memories that may operate modules and/or engines of the virtual 3D model quality assessment system. FIG. 1 is a schematic illustration of one example of an apparatus, configured as virtual 3D model quality assessment system 100. In this example, the apparatus (e.g., system) includes an optional treatment type input/selector module 103 that may receive input indicating the type of treatment (e.g., tooth straitening, etc.) to be performed. This module is optional; in some examples the apparatus may be dedicated or specific to a particular type of treatment. In FIG. 1A the treatment may be selected.

Any of the modules shown in FIG. 1A may include be configured as one or more engines and/or may include one or more datastores. A computer system can be implemented as an engine, as part of an engine or through multiple engines. As used herein, an engine may include one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures herein.

The engines described herein, or the engines through which the systems and devices described herein can be implemented, can be cloud-based engines. As used herein, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used herein, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described herein.

Datastores can include data structures. As used herein, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described herein can be cloud-based datastores. A cloud-based datastore is a datastore that is compatible with cloud-based computing systems and engines.

The virtual 3D model quality assessment system 100 shown in FIG. 1 may include a computer-readable medium containing one or more of these engines and/or modules. One or more of the modules and/or engines and/or datastores may be coupled to one another (e.g., through the example connections shown in FIG. 1) or to one or more modules/engines/datastores not explicitly shown in FIG. 1. The computer-readable medium may include any computer-readable medium, including without limitation a bus, a wired network, a wireless network, or some combination thereof.

In FIG. 1A the system also includes a virtual 3D model receiving engine 105 that may receive the virtual 3D model through an input 102. The virtual 3D model quality assessment system may also include a scoring engine 111 that may operate on the received virtual 3D model using a trained machine learning agent. In FIG. 1A the trained machine learning agent may be included in a database 109 or other module. As mentioned above, in some examples the system may be configured to assess the fitness of a virtual 3D model for a single treatment type (e.g., aligner-based tooth correction) while in some examples the system may select from among different treatment types using the treatment type input/selector module 103 and a selector engine for selecting the machine learning agent that is trained on the particular treatment selected 107. The selector engine 107 may select the appropriate machine learning agent from a library of trained machine learning agents 109.

The system shown in FIG. 1 may also include an output engine 113 that may be configured to apply the score determined by the scoring engine 111. For example, the output engine 113 may directly output the score or an indicator of the score (e.g., to a display, for transmission, or to pass onto another apparatus or component of the system or a sub-system. Alternatively or additionally, the output engine 113 may pass the virtual 3D model (based on the score) to a virtual 3D model modification engine 115, which may be part of the same system or a different system. If the score indicates that the virtual 3D model is appropriate for the treatment being contemplated, the output engine may pass the virtual 3D model on to a treatment planning engine 117 that may be part of the same system, a sub-system or a different system.

Figure 2A:
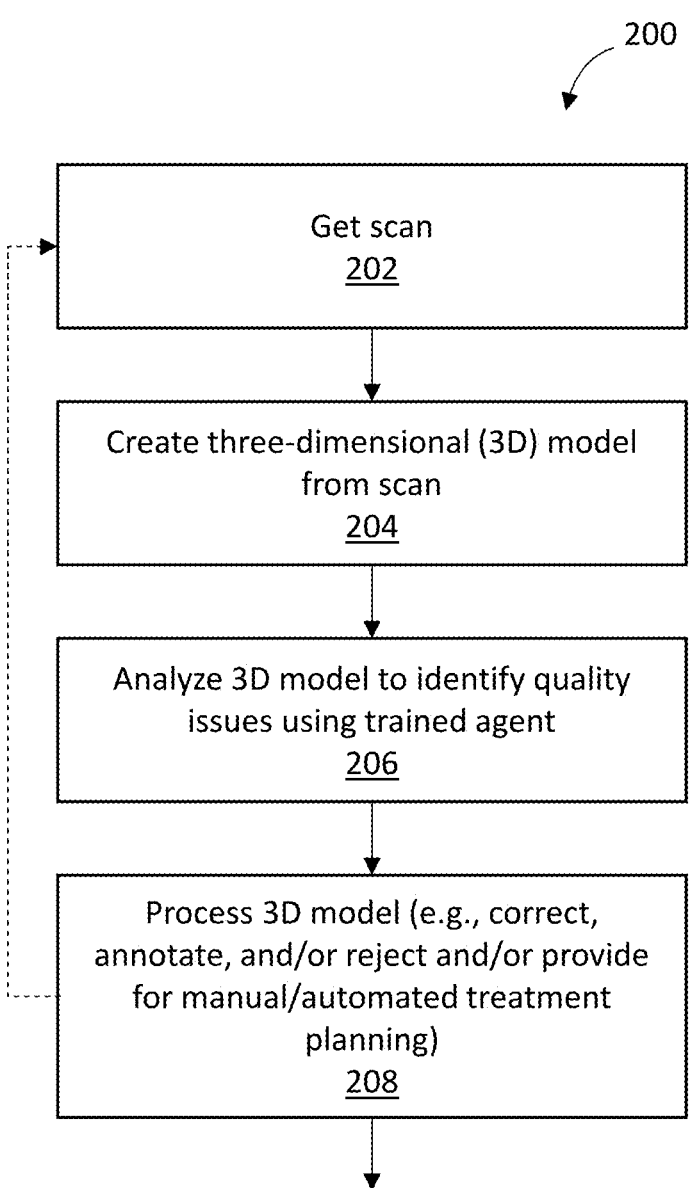
FIG. 2A illustrates an example of a method of assessing the quality of a virtual 3D model.

FIG. 2A schematically illustrates an example of a relatively high level method of assessing the fitness of a virtual 3D model of a patient's dentition. In FIG. 2A, the method may optionally include taking and/or receiving a digital scan of the patient's dentition 202 (e.g., upper arch, lower arch, upper and lower arch, etc.). The method may optionally generate the virtual 3D model from the scan data, or it may receive the virtual 3D model. The method may then analyze the virtual 3D model using a trained machine learning agent (e.g., trained neural network) to identify defects in the virtual 3D model 206. As described below, optionally any of these methods may include training the machine learning agent.

Once the machine learning agent has scored the virtual 3D model the score may be used to process the virtual 3D model 208. For example, if the score indicates that the virtual 3D model is appropriate or adequate for use with a particular treatment (e.g., for use generating a treatment plan) then the method may include one or more of: outputting the score or an indicator of the score (e.g., "pass", "appropriate for treatment planning, etc.); passing the virtual 3D model to a treatment planning engine to generate treatment plan, storing and/or annotating the virtual 3D model as appropriate for treatment planning, etc. Alternatively if the score is intermediate, indicating that the virtual 3D model may be appropriate and/or may need further correction/processing it may output an annotated version of the virtual 3D model or other comments to this effect. In some examples the method may include modifying the virtual 3D treatment plan. In some examples the score may indicate that the virtual 3D model should be rejected and not used for treatment planning; the method may include outputting a message to this effect.

Figure 2B:
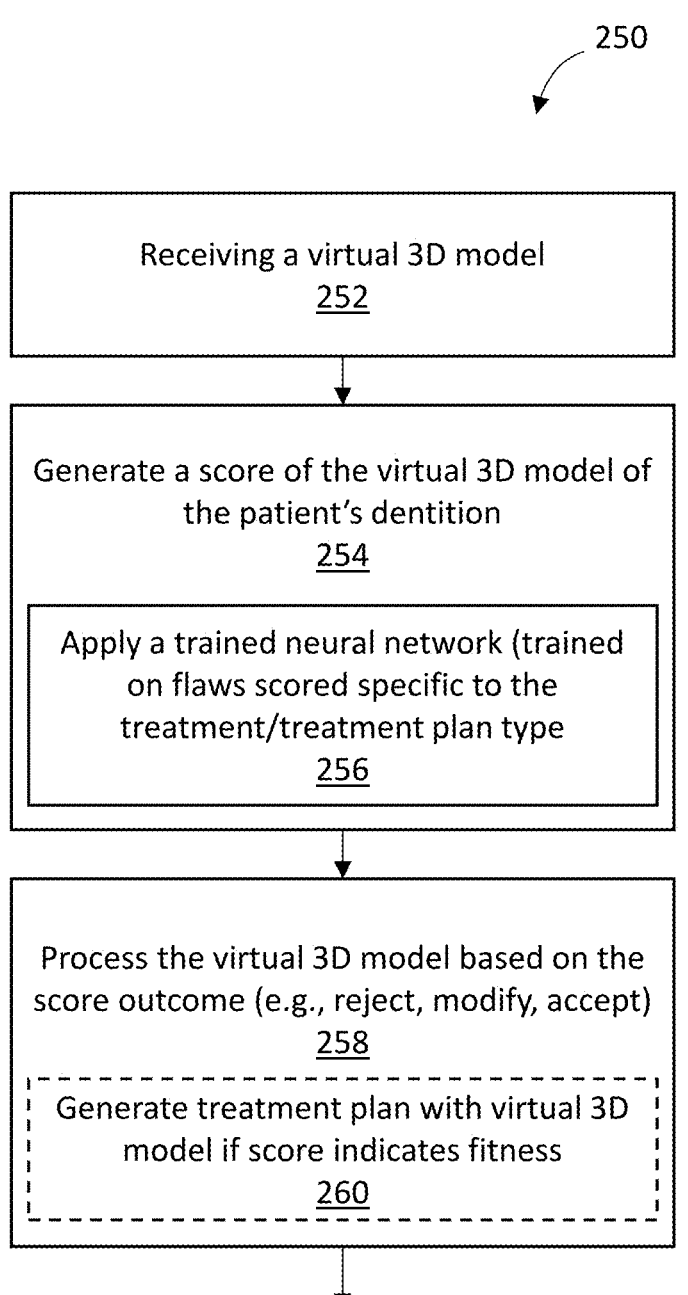
FIG. 2B illustrates an example of a method of assessing the quality of a virtual 3D model for a particular treatment.

FIG. 2B shows another example of a method 250 of assaying the fitness of a virtual 3D model of a patient's dentition for use in treatment planning for a particular dental/orthodontic treatment. In the method shown in FIG. 2B, the virtual 3D model of the patient's dentition is received 252 and a score of the fitness of the virtual 3D model may be generated 254. For example, as described above, a trained machine learning agent (e.g., trained neural network) may be applied to review the virtual 3D model 256. This trained machine learning agent may be trained on 3D models including one or more flaws; the training dataset may indicate the fitness (or other score) of the training 3D model(s) for use with a treatment (e.g., to generate a treatment plan).

Once the virtual 3D model is scored, the virtual 3D model may again be processed 258 as described above, to reject and/or modify and/or approve of the virtual 3D model. If the score indicates approval, in some examples the method may automatically generate a treatment plan using the virtual 3D model 260.

FIGS. 2C and 2D show another example of a method (or logic of a system configured to perform the method) for preparing a virtual three-dimensional (3D) model that incorporates the techniques described in FIGS. 2A-2B. In FIG. 2C, the virtual (e.g., digital) 3D model of the subject's dentition may be initially received or generated 1301. The system or method may then evaluate the virtual 3D model for one or more quality criteria. As mentioned, quality criteria may indicate: one or more defect types (e.g., types of quality issues) and may be examined at a plurality of different regions (e.g., vertices, edges, faces, etc.) and/or one or more measures of one or more defect types at each region (e.g., probability of the defect type at each region and/or severity of the defect type) 1303. In any of these examples described herein, the virtual 3D model may be a 3D mesh.

Thus, the method may include performing the quality determination for the virtual 3D model by evaluating the virtual 3D model for one or more quality criteria, wherein the one or more quality criteria provide a basis for one or more defect types and for one or more measures of the one or more defect types at each of the plurality of regions This evaluation may include using pattern machine comparing to known defect types (e.g., using a trained machine learning model) 1305. This step of evaluating the virtual 3D model may also include generating a quality determination (e.g., defect type(s), probability and/or severity of defect type(s)), and associating a quality determination with virtual 3D model 1307.

Any of these methods (or apparatuses for performing them) may also include performing one or more actions with the virtual 3D model based on the quality determination (e.g., compare the one or more quality determinations to a threshold for the virtual 3D model, etc.) 1309. This may include comparing the quality determination for the virtual 3D model to one or more thresholds for defect types to determine if the virtual 3D model should be retaken, repaired, or passed on for use (see FIG. 2D) 1311. For example, as shown in FIG. 2D, the method may include comparing the quality determination to one or more threshold based on the type of defect (e.g., the type of quality issue) 1351. If the risk is greater than the threshold(s) 1353 then the type of defect and/or the severity/extent of the defect may indicate that the virtual 3D model should be re-determined (e.g., by retaking images/rescanning the subject's dentition) 1357. For example the method may cause the system to reject the virtual 3D scan and to re-scan/retake the images to generate a new virtual 3D model 1361. In some cases the one or more measurements may indicate (after comparison to the virtual 3D model to the quality criteria to generate a measure of the one or more defects) that the virtual 3D model should be repaired 1363.

Alternatively in some examples if the risk (as measured by the quality determination) is less than the threshold (e.g., in some examples for all of the detected defects) 1355, then the system may pass the virtual 3D model, indicating it may be reliably used 1359.

Figure 2E:
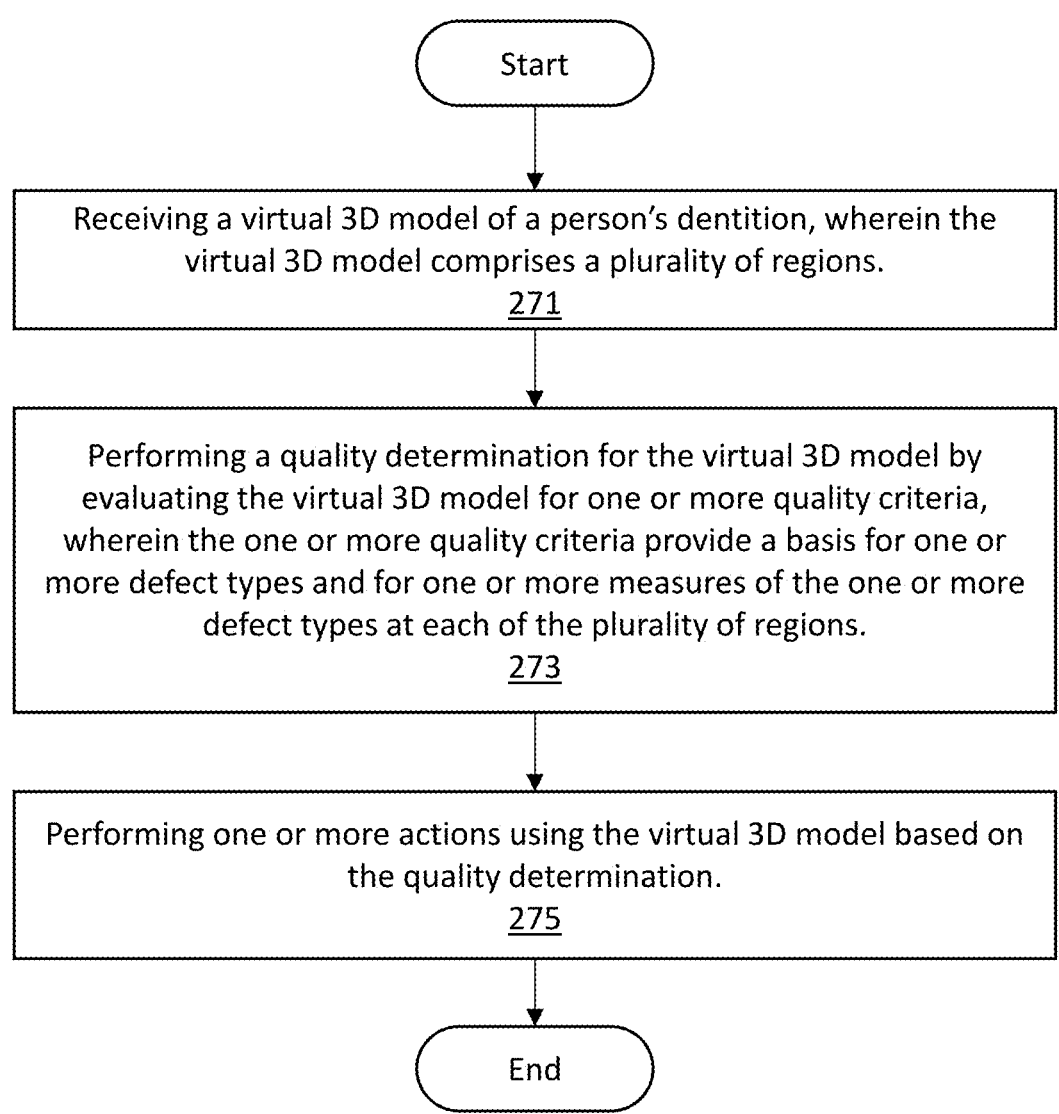
FIG. 2E shows an example of a method of preparing a virtual three-dimensional (3D) model including assessing the quality of a virtual 3D model.

FIG. 2E illustrates another example of a method for preparing a virtual 3D model. In this example, the method includes receiving a virtual 3D model of a person's dentition 271, wherein the virtual 3D model comprises a plurality of regions. The method also includes performing a quality determination for the virtual 3D model by evaluating the virtual 3D model for one or more quality criteria, wherein the one or more quality criteria provide a basis for one or more defect types and for one or more measures of the one or more defect types at each of the plurality of regions 273. Finally, the method includes performing one or more actions using the virtual 3D model based on the quality determination 275.

FIG. 2F shows another variation of the method shown in FIG. 2E, including the additional steps of receiving/taking and/or taking an intraoral scan of the patient's (subject's) dentition 281 and transforming the intraoral scan into a virtual 3D model 283. As mentioned, the method may also include performing a quality determination for the virtual 3D model by evaluating the virtual 3D model for one or more quality criteria, wherein the one or more quality criteria provide a basis for one or more defect types and for one or more measures of the one or more defect types at each of the plurality of regions 285. The method includes performing one or more actions using the virtual 3D model based on the quality determination 287. In general, any of these methods may also include identifying a target position and a plurality of intermediate arrangements (corresponding to a treatment plan) 289. These methods may also include using the plurality of intermediate arrangements to form a series of dental appliances 291.

Figures 3A, 3B:
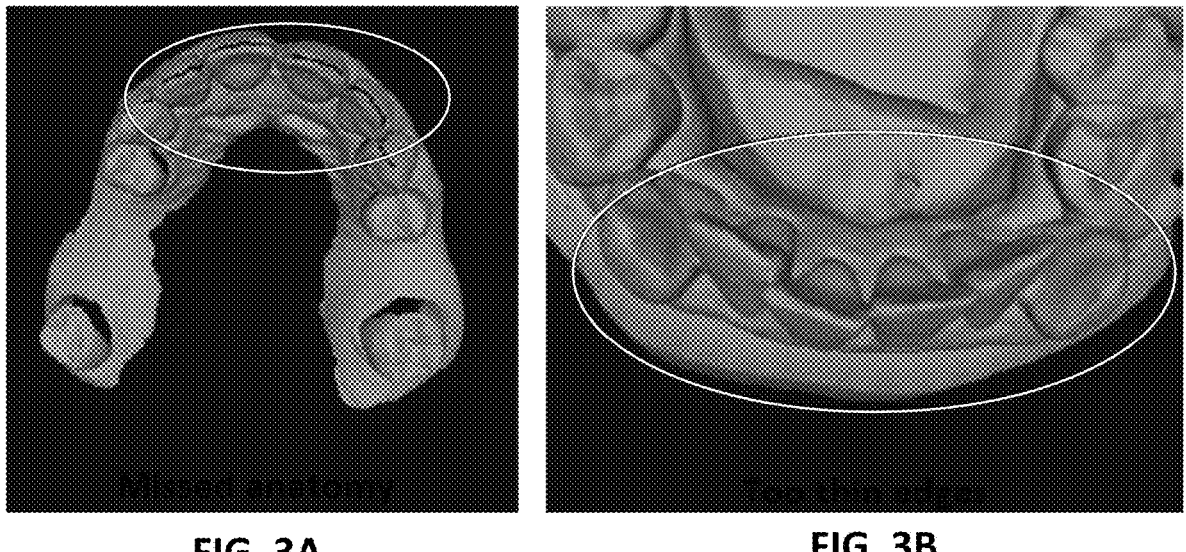
FIGS. 3A-3D illustrate examples of flaws of virtual 3D models that may be identified and scored by the methods and apparatuses described herein.
Figures 3C, 3D:
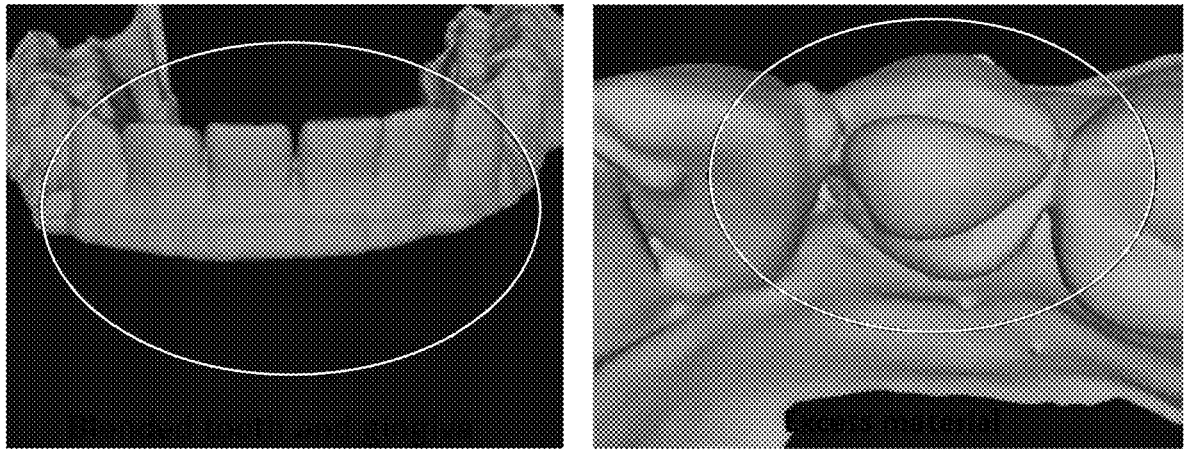

As mentioned there are a variety of different virtual 3D models that the machine learning agent may be trained on in order to assess the fitness of he virtual 3D model in generating one or more treatment plans. For example, FIGS. 3A-3C (and separately, FIGS. 4A-4B, 5, 6, 7, 8A-8B, 9A-9B, 10A-10B, 11A-11B and 12) illustrate examples of flaws that may be identified and may contribute towards scoring a particular virtual 3D model as described herein. In FIG. 3A the virtual 3D model includes a missing region of the anatomy (e.g., the teeth, circled). In FIG. 3B, some of the edges (circled region) of the virtual 3D model are too thin. In FIG. 3C, the flaw in the virtual 3D model is due to blending of the teeth and gingiva (circled region). In FIG. 3D, the virtual 3D model is an example of a virtual 3D model including excess material from the scan (e.g., material that is not part of the actual teeth and/or gingiva but may be on them).

In general, the methods described herein may automatically assess the quality of virtual 3D model and may automatically reject virtual 3D models in cases in which the virtual 3D model is too flawed (e.g., too risky) to proceed with this model. Thus, any of these methods and apparatuses may detect one or more zones on a virtual 3D model having major defects. The methods and apparatuses may detect a variety of types of defect (e.g., missed surface, extra material, stitching defect, etc.) either explicitly, e.g., and may annotate the virtual 3D model, or implicitly (without necessarily annotating).

Any of these methods and apparatuses may notify a user about the level of risks in the case the user decides to proceed with the virtual 3D model for treatment planning, despite one or more defects. For example, the method or apparatus may provide a score (e.g., in percentage) representing a fitness of the virtual 3D model for use in treatment planning for a particular treatment. In some examples, the method or apparatus may be integrated into a larger method or apparatus (e.g., system), e.g., for designing and/or treatment planning. For example, any of these methods and apparatuses may be integrated as part of a detector in a production pipeline for a treatment (e.g., when manufacturing a series of aligners). In some examples, any of these methods or apparatuses may include integration of the detector in production pipeline to include automatic routing of the cases with high risks depending on the defect type. In some examples, this output may include sending a rejection form to the doctor and/or sending to an appropriate party for repair (e.g., if the problem could be fixed, e.g., by software manipulation of the 3D model).

In some examples, the methods and apparatuses described herein may include visualization of the score or risks on the scanner (e.g., intraoral scanner), so that the user may receive immediate feedback that the scan is to be rejected. This feedback may be concurrent with or after scanning is complete. The methods and apparatuses described herein may also or alternatively include an output for the score as part of a software program, e.g., to allow the user to estimate the risk in case manual revision of the virtual 3D model is also performed.

The methods and apparatuses described herein may significantly increase the speed at which treatment planning and/or processing for treatment planning may occur. In any of these methods and apparatuses, the scan and/or the virtual 3D model may, as an initial or nearly initial step, be analyzed for the presence of one or more zones with defects that could represent a risk. Examples of distinct defect types are shown in FIGS. 3A-3D and other examples are provided below.

The methods and apparatuses described herein may generally use one or more machine learning (ML) agents. For example, these methods and apparatuses may include a ML-based detection. A ML model may be trained on a variety of virtual 3D models that were rejected in production for having one or more flaws. The methods described herein may help predict the type of defect and the probability of such defect for each vertex/edge/face of virtual 3D model.

Thus, a training dataset may be balanced by the types of defects present. Based on these predictions of the quality/fitness of the virtual 3D model for a particular treatment (or for use as a part of a type of treatment method), the post-processing may transform vertex/edge/face predictions into prediction of the areas of defect with certain risks level. The ML approach described herein is not the only technique that may be used. For example, a number of defects could be detected using 3D algorithms. E.g. big holes could be detected algorithmically. The methods and apparatuses described herein may generally include the use of machine learning and other computational or analytic methods.

In some cases the scoring may also include annotating the virtual 3D model either directly (e.g., in/on the model) or indirectly (e.g., in an accompanying file or location). In some cases the method or apparatus may include flagging all or portion of a virtual 3D model depending on the type of defect the case may be, e.g., routed to an appropriate location or sub-system (e.g., a doctor or special group of users that has tools to correct the defect). Appropriate annotations may be generated (e.g. description of a defect, numerical representation of the risk/score, screenshot of the area affected, etc.).

As mentioned above, in general, any of these apparatuses and methods may be incorporated into a scanner (e.g., dental scanner, such as, but not limited to, an intraoral scanner). so that user (e.g., technician, doctor, etc.) could see that current scan has major defects that are considered risky and very likely to affect the treatment quality.

FIG. 4A-4B illustrate another example of a group of virtual 3D models as well as a potential for scoring these groups. In FIGS. 4A and 4B the defect is noise (e.g., nose on the scanned input). In Both FIGS. 4A and 4B the defect (nose) results in odd, irregular surface features of the model. In this example, the defect in FIG. 4A is much less likely to cause a problem, while in FIG. 4B the defect appears more significant, particularly in regions likely to impact fit of an aligner.

Figure 6:
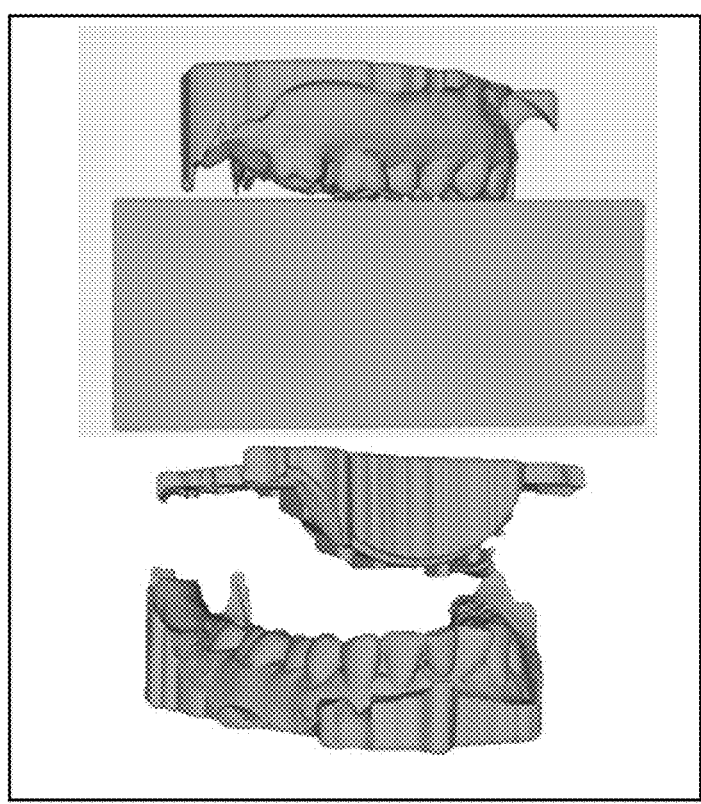
FIG. 6 shows examples of virtual 3D scans that do not show teeth extraction flaws.
Figure 7:
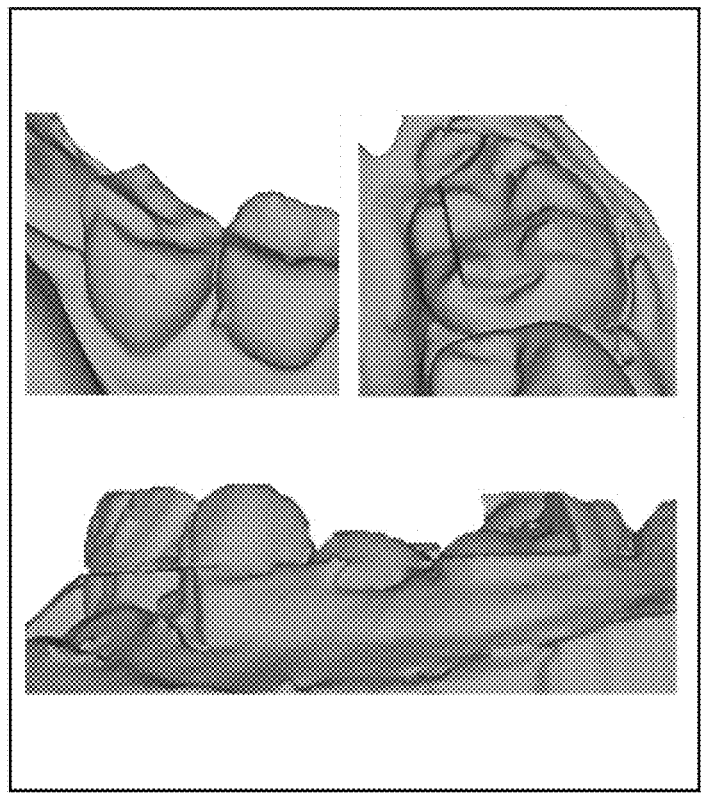
FIG. 7 shows examples of virtual 3D scans that include artificial or step transition flaws.

FIG. 5 shows another example of a virtual 3D model having a flaw; in FIG. 5 the flaw is over smoothing (particularly visible in the upper jaw), resulting in poor if any distinction between the teeth and gingiva. FIG. 6 shows an example of virtual 3D models that are flawed because no teeth were extracted. In FIG. 7, the flaw in the virtual 3D models are the artifactual steps in the virtual 3D model. The trained network may recognize these flaws and provide a score.

Figures 8A, 8B:
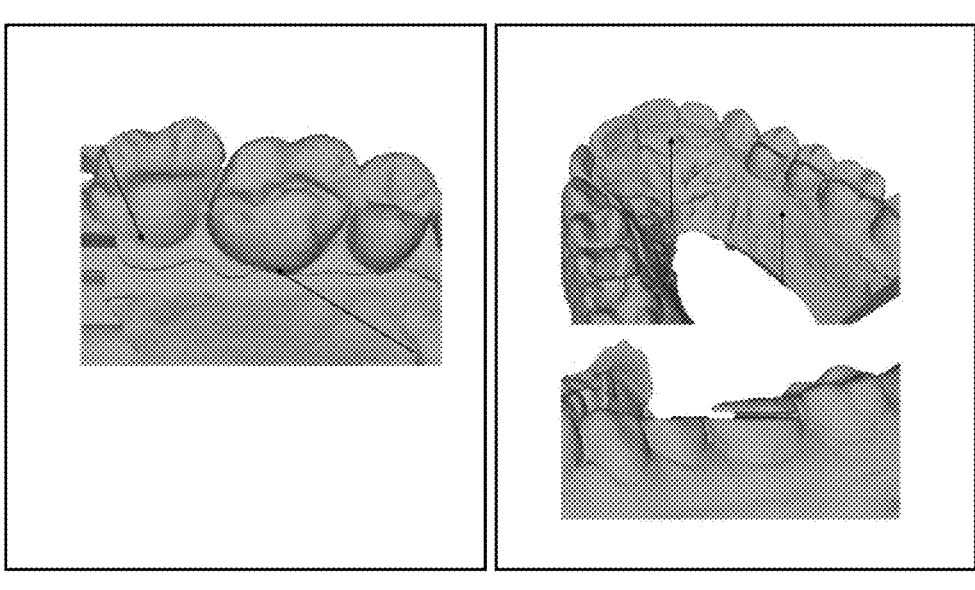
FIGS. 8A-8B shows examples of virtual 3D scans having louvering flaws.

FIGS. 8A-8B illustrate examples of virtual 3D images that are flawed as they include louvering (see arrows in FIG. 8A). In this example, the flaws in the virtual 3D model of FIG. 8A may be determined to be less severe than the flaws in the virtual 3D model of FIG. 8B. Any of the examples of virtual 3D models described herein in FIGS. 3A-3D, 4-12 may be used for training a neural network.

Figures 9A, 9B:
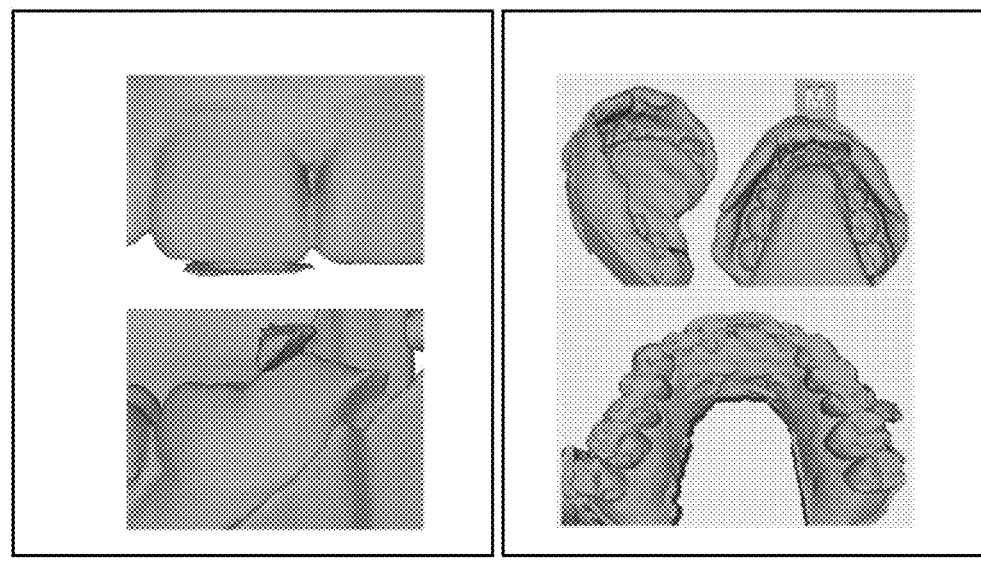
FIGS. 9A-9B shows examples of virtual 3D scans having tray extraction flaws.

FIGS. 9A-9B show examples of virtual 3D images that are flawed because they include tray extension regions. In this example, the flaws in the virtual 3D model of FIG. 9A may be determined to be less severe than the flaws in the virtual 3D model of FIG. 9B.

Figures 10A, 10B:
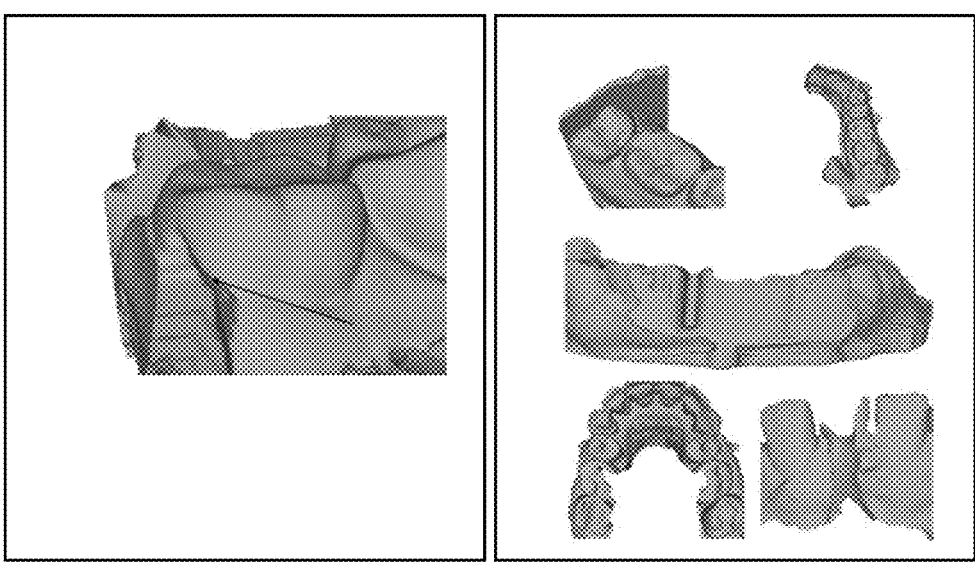
FIGS. 10A-10B shows examples of virtual 3D scans having missing data flaws.

In FIGS. 10A-10B the virtual 3D scans are missing data (e.g., unscanned regions or regions that were insufficiently scanned). The defect shown in FIG. 10A (arrow) is lateral and posterior and may not interfere significantly with treatment planning for making one or more aligners; thus the ML agent may score this example relatively high (e.g., 0.7), whereas the virtual 3D scans on the right are missing regions within the crown/buccal regions that interfere more with aligner design; therefor these virtual 3D models may score lower than the model in FIG. 10A.

Figures 11A, 11B:
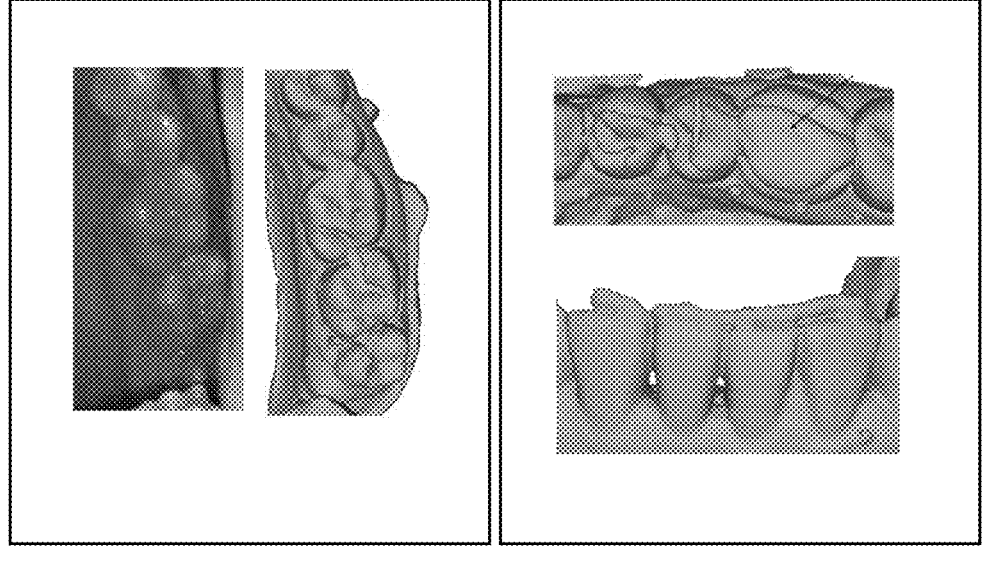
FIGS. 11A-11B shows examples of virtual 3D scans having bubble flaws.

Similarly, FIGS. 11A-11B illustrate examples of less severe (FIG. 11A) and more sever (FIG. 11B) scans including bubbles (e.g., hidden bubbles) that are artifactual.

Finally, FIGS. 12A-12B illustrate examples of clipping of scans. In this example, the clipping is occurring to approximately the same extent and in the same general region (near the tops of the crowns) and may likely be scored nearly equivalently.

Figure 13:
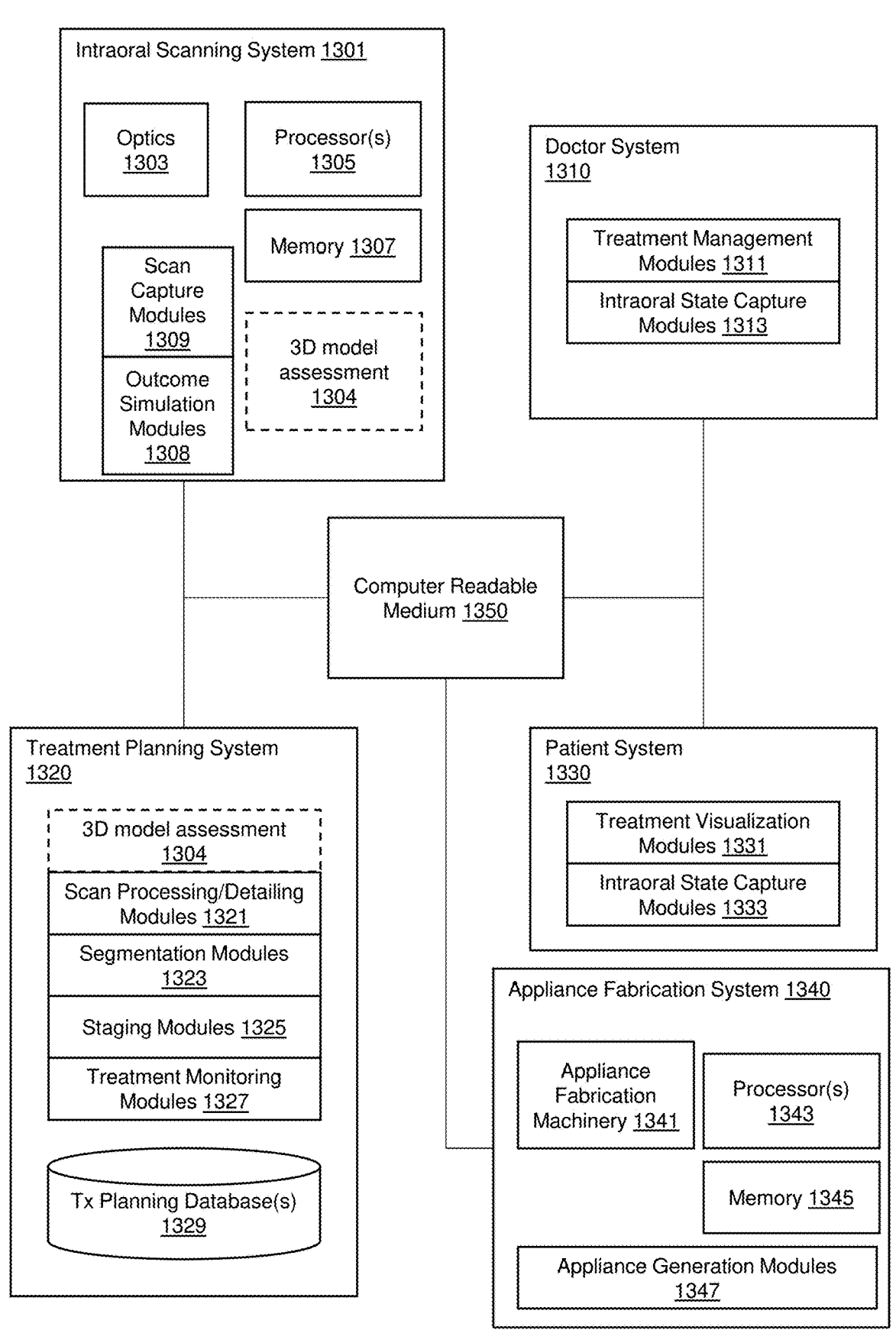
FIG. 13 is a diagram of one example of a computing environment within which the methods and apparatuses described herein may be implemented.

In general, these methods and apparatuses may be used at one or more parts of a dental computing environment, including as part of an intraoral scanning system, doctor system, treatment planning system, patient system, and/or fabrication system. In particular, these methods and apparatuses may be used as part of an intraoral scanning system and/or treatment planning system, for example, to generate an accurate digital model of the patient's dentition, from which treatment plans, and/or designs for one or more dental appliances to perform the treatment plan may be generated. For example, FIG. 13 is a diagram illustrating one variation of a computing environment 1300 that may generate one or more dental treatment plans specific to a patient, and fabricate dental appliances that may accomplish the treatment plan to treat a patient, under the direction of a dental professional. The example computing environment 1300 shown in FIG. 13 includes an intraoral scanning system 1301, a doctor system 1310, a treatment planning system 1320, a patient system 1330, an appliance fabrication system 1340, and computer-readable medium 1350. In some variations a computing environment (dental computing system) 1300 may include just one or a subset of these systems (which may also be referred to as sub-systems of the overall system 1300). Further, one or more of these systems may be combined or integrated with one or more of the other systems (sub-systems), such as, e.g., the patient system and the doctor system may be part of a remote server accessible by doctor and/or patient interfaces. The computer readable medium 1360 may divided between all or some of the systems (subsystems); for example, the treatment planning system and appliance fabrication system may be part of the same sub-system and may be on a computer readable medium 1360. Further, each of these systems may be further divided into sub-systems or components that may be physically distributed (e.g., between local and remote processors, etc.) or may be integrated.

An intraoral scanning system may include an intraoral scanner as well as one or more processors for processing images. For example, an intraoral scanning system 1301 can include optics (e.g., lenses, filters, camera(s), etc.) 1303, processor(s) 1305, a memory 1307, scan capture modules 1309, and outcome simulation modules 1309. Any of these intraoral scanning systems may include a 3D model assessment sub-system 1304, as described above (e.g., FIGS. 2A-2B, 2C-2D, 2E-2F). In general, the intraoral scanning system 1301 can capture one or more images of a patient's dentition. Use of the intraoral scanning system 1301 may be in a clinical setting (doctor's office or the like) or in a patient-selected setting (the patient's home, for example). In some cases, operations of the intraoral scanning system 1301 may be performed by an intraoral scanner, dental camera, cell phone or any other feasible device.

The optics 1303 may include one or more lenses and optical sensors to capture reflected light, particularly from a patient's dentition. The scan capture modules 1309 can include instructions (such as non-transitory computer-readable instructions) that may be stored in the memory 1307 and executed by the processor(s) 1305 to can control the capture of any number of images of the patient's dentition.

As mentioned, in some examples the methods and apparatuses described herein for generating a 3D model, e.g., for preparing a virtual 3D model, may include performing a quality determination to assess the fitness of the virtual 3D model, and in particular, the fitness of the virtual 3D model for a particular treatment. For example, the outcome simulation modules 1308, which may be part of the intraoral scanning system 1301, can include instructions that assess the quality of the virtual 3D scan.

Any of the component systems or sub-systems of the dental computing environment 1300 may access or use the 3D model of the patient's dentition generated by the methods and apparatuses described herein. For example, the doctor system 1310 may include treatment management modules 1311 and intraoral state capture modules 1313 that may access or use the virtual 3D model. The doctor system 1310 may provide a "doctor facing" interface to the computing environment 1300. The treatment management modules 1311 can perform any operations that enable a doctor or other clinician to manage the treatment of any patient. In some examples, the treatment management modules 1311 may provide a visualization and/or simulation of the patient's dentition with respect to a treatment plan. For example, the doctor system may include a user interface for the doctor that allows the doctor to review the results of the quality determination and/or to help repair the virtual 3D model in cases in which the actions taken include repairing the virtual 3D scan.

The intraoral state capture modules 1313 can provide images of the patient's dentition to a clinician through the doctor system 1310. The images may be captured through the intraoral scanning system 1301 and may also include images of a simulation of tooth movement based on a treatment plan. For example, the treatment management modules 1311 can enable the doctor to modify or revise a treatment plan, particularly when images provided by the intraoral state capture modules 1313 indicate that the movement of the patient's teeth may not be according to the treatment plan. The doctor system 1310 may include one or more processors configured to execute any feasible non-transitory computer-readable instructions to perform any feasible operations described herein.

Although the virtual 3D model assessment module 1304 may be part of, or accessed and implemented by the intraoral scanning system 1301, alternatively or additionally it may be included in, accessed by and/or implemented by the treatment planning system 1320. The treatment planning system 1320 may include any of the methods and apparatuses described herein, and/or may access the results. The treatment planning system 1320 may include scan processing/detailing modules 1321, segmentation modules 1323, staging modules 1325, treatment monitoring modules 1327, and treatment planning database(s) 1329. In general, the treatment planning system 1320 can include the 3D model assessment module 1304 as mentioned. In general, the treatment planning system 1320 may determine a treatment plan for any feasible patient. The scan processing/detailing modules 1321 can receive or obtain dental scans (such as scans from the intraoral scanning system 1301) and can process the scans to "clean" them by removing scan errors and, in some cases, enhancing details of the scanned image.

A treatment planning system may include a segmentation modules 1323 that can segment a dental model into separate parts including separate teeth, gums, jaw bones, and the like. In some cases, the dental models may be based on scan data from the scan processing/detailing modules 1321. The staging modules 1325 may determine different stages of a treatment plan. Each stage may correspond to a different dental aligner. The staging modules 1325 may also determine the final position of the patient's teeth, in accordance with a treatment plan. Thus, the staging modules can determine some or all of a patient's orthodontic treatment plan. In some examples, the staging modules can simulate movement of a patient's teeth in accordance with the different stages of the patient's treatment plan.

The treatment monitoring modules 1327 can monitor the progress of an orthodontic treatment plan. In some examples, the treatment monitoring modules can provide an analysis of progress of treatment plans to a clinician. The orthodontic treatment plans may be stored in the treatment planning database(s). Although not shown here, the treatment planning system can include one or more processors configured to execute any feasible non-transitory computer-readable instructions to perform any feasible operations described herein.

The patient system 1330 can include treatment visualization modules 1331 and intraoral state capture modules 1333. In general, the patient system 1330 can provide a "patient facing" interface to the computing environment 1300. The treatment visualization modules 1331 can enable the patient to visualize how an orthodontic treatment plan has progressed and also visualize a predicted outcome (e.g., a final position of teeth).

In some examples, the patient system can capture dentition scans for the treatment visualization modules 941 through the intraoral state capture modules. The intraoral state capture modules can enable a patient to capture his or her own dentition through the intraoral scanning system 1301. Although not shown here, the patient system 1330 can include one or more processors configured to execute any feasible non-transitory computer-readable instructions to perform any feasible operations described herein.

The appliance fabrication system 1340 can include appliance fabrication machinery 1341, processor(s) 1343, memory 1345, and appliance generation modules 1347. In general, the appliance fabrication system 1340 can directly or indirectly fabricate aligners to implement an orthodontic treatment plan. In some examples, the orthodontic treatment plan may be stored in the treatment planning database(s).

The appliance fabrication machinery 1341 may include any feasible implement or apparatus that can fabricate any suitable dental aligner. The appliance generation modules 1347 may include any non-transitory computer-readable instructions that, when executed by the processor(s) 1343, can direct the appliance fabrication machinery 1341 to produce one or more dental aligners. The memory 1345 may store data or instructions for use by the processor(s) 1343. In some examples, the memory may temporarily store a treatment plan, dental models, or intraoral scans.

The computer-readable medium 1350 may include some or all of the elements described herein with respect to the computing environment 1300. The computer-readable medium may include non-transitory computer-readable instructions that, when executed by a processor, can provide the functionality of any device, machine, or module described herein.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits described herein.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like. For example, any of the methods described herein may be performed, at least in part, by an apparatus including one or more processors having a memory storing a non-transitory computer-readable storage medium storing a set of instructions for the processes(s) of the method.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

As described herein, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein.

Alternatively or in combination, the processor can be configured to combine one or more steps of one or more methods as disclosed herein.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

In general, any of the apparatuses and methods described herein should be understood to be inclusive, but all or a sub-set of the components and/or steps may alternatively be exclusive and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for preparing a virtual three-dimensional (3D) model, the method comprising:

receiving a virtual 3D model of a person's dentition, wherein the virtual 3D model comprises a plurality of regions;

performing a quality determination for the virtual 3D model by evaluating the virtual 3D model for one or more quality criteria, wherein the one or more quality criteria provide a basis for one or more defect types and for one or more quality measures of the one or more defect types at each of the plurality of regions; and performing one or more actions using the virtual 3D model based on the quality determination, wherein performing the one or more actions comprises outputting a description of a risk associated with the one or more quality measures.

2. The method of claim 1, wherein performing the one or more actions comprises performing the one or more actions after comparing the quality determination to a quality threshold for the virtual 3D model.

3. The method of claim 1, wherein the plurality of regions comprise: one or more of: vertices of the virtual 3D model, edges of the virtual 3D model, and/or faces of the virtual 3D model.

4. The method of claim 1, wherein the one or more quality measures of the one or more defect types comprises one or more probabilities of known defect types at each of the plurality of regions.

5. The method of claim 1, wherein evaluating the virtual 3D model for the one or more quality criteria comprises evaluating patterns in each of the plurality of regions against patterns in training 3D models in a training dataset having known defect types.

6. The method of claim 5, wherein evaluating the patterns in the plurality of regions against the patterns in the training 3D models comprises performing image classification on the virtual 3D model.

7. The method of claim 1, wherein evaluating the virtual 3D model for the one or more quality criteria comprises evaluating the plurality of regions for probabilities of known defect types.

8. The method of claim 1, wherein evaluating the virtual 3D model for the one or more quality criteria comprises using a machine learning model trained to evaluate patterns in one or more of the plurality of regions against patterns in a training dataset of 3D models with known defect types.

9. The method of claim 8, wherein the machine learning model comprises a neural network.

10. The method of claim 8, wherein the machine learning model is trained to perform image classification on the training dataset of 3D models.

11. The method of claim 8, wherein the plurality of regions comprises one or more of: vertices of the virtual 3D model, edges of the virtual 3D model, and/or faces of the virtual 3D model.

12. The method of claim 1, wherein the one or more quality criteria provide a basis to identify scan errors due to a mix of primary and permanent teeth in the person's dentition.

13. The method of claim 1, wherein the one or more quality criteria provide a basis to identify scan errors due to thinly scanned edges in a scan of the person's dentition.

14. The method of claim 1, wherein the one or more quality criteria provide a basis to identify scan errors due to blending of teeth and gingiva in a scan of the person's dentition.

15. The method of claim 1, wherein the one or more quality criteria provide a basis to identify scan errors due to excess material errors in a scan of the person's dentition.

16. The method of claim 1, wherein performing the one or more actions using the virtual 3D model based on the quality determination comprises providing instructions as to whether or not the virtual 3D model crosses a quality threshold.

17. The method of claim 1, wherein performing the one or more actions using the virtual 3D model based on the quality determination comprises generating a treatment plan using the virtual 3D model.

18. The method of claim 1, wherein performing the one or more actions using the virtual 3D model based on the quality determination comprises providing a treatment plan using the virtual 3D model for manual quality inspection.

19. The method of claim 1, wherein performing the one or more actions using the virtual 3D model based on the quality determination comprises modifying the virtual 3D model to correct one or more defects.

20. The method of claim 1, wherein performing the one or more actions using the virtual 3D model based on the quality determination comprises outputting a description of one or more defects associated with the one or more quality measures.

21. The method of claim 1, wherein performing the one or more actions using the virtual 3D model based on the quality determination comprises providing a screenshot of one or more defects associated with the one or more quality measures.

22. The method of claim 1, wherein outputting the description of the risk associated with the one or more quality measures comprises outputting one or more numerical representations of the risk associated with the one or more quality measures.

23. The method of claim 1, wherein performing the one or more actions using the virtual 3D model based on the quality determination comprises using the virtual 3D model to identify an initial position of the person's dentition.

24. The method of claim 23, further comprising identifying a target position and a plurality of intermediate arrangements to move the person's dentition from the initial position toward the target position.

25. The method of claim 24, further comprising using the plurality of intermediate arrangements to identify a series of dental appliances to implement a treatment plan.

26. The method of claim 25, wherein the series of dental appliances comprise a series of aligners, a series of palatal expanders, or some combination thereof.

27. The method of claim 1, wherein performing the one or more actions using the virtual 3D model based on the quality determination comprises accepting or rejecting the person's dentition for treatment planning based on the quality determination.

28. The method of claim 1, wherein performing the one or more actions using the virtual 3D model based on the quality determination comprises rescanning the person's dentition to generate an intraoral scan.

29. The method of claim 28, further comprising transforming the intraoral scan into a new virtual 3D model.

30. The method of claim 28, wherein the method is executed by an intraoral scanner.

31. The method of claim 30, wherein the intraoral scanner is configured to generate a 3D mesh model of the person's dentition.

32. The method of claim 30, wherein performing the one or more actions using the virtual 3D model based on the quality determination comprises outputting instructions to a user of the intraoral scanner that the virtual 3D model has significant defects and/or is considered risky and/or is likely to adversely affect treatment quality.

33. The method of claim 30, wherein performing the one or more actions using the virtual 3D model based on the quality determination comprises outputting instructions to fabricate one or more dental appliances using the virtual 3D model.

34. The method of claim 30, wherein performing the one or more actions using the virtual 3D model based on the quality determination comprises fabricating one or more dental appliances using the virtual 3D model.

35. The method of claim 34, wherein the one or more dental appliances comprise one or more of: one or more palatal expanders, one or more dental aligners, one or more restorations and/or one or more implants.

36. A system, the system comprising:

one or more processors;

a memory coupled to the one or more processors and configured to store computer-program instructions, that when executed by the one or more processors, cause the system to perform:

receiving a virtual three-dimensional (3D) model of a person's dentition, wherein the virtual 3D model comprises a plurality of regions;

performing a quality determination for the virtual 3D model by evaluating the virtual 3D model for one or more quality criteria, wherein the one or more quality criteria provide a basis for one or more defect types and for one or more quality measures of the one or more defect types at each of the plurality of regions; and performing one or more actions using the virtual 3D model based on the quality determination, wherein performing the one or more actions comprises outputting a description of a risk associated with the one or more quality measures.

37. The system of claim 36, further comprising an intraoral scanner.

38. A system, the system comprising:

an intraoral scanner comprising a light source and optics configured to capture images of a person's dentition;

one or more processors configured to generate a virtual three-dimensional (3D) model of the person's dentition from the captured images; and a memory coupled to the one or more processors and configured to store computer-program instructions, that when executed by the one or more processors, cause the system to perform:

receiving a virtual 3D model of the person's dentition, wherein the virtual 3D model comprises a plurality of regions;

performing a quality determination for the virtual 3D model by evaluating the virtual 3D model for one or more quality criteria, wherein the one or more quality criteria provide a basis for one or more defect types and for one or more quality measures of the one or more defect types at each of the plurality of regions; and performing one or more actions using the virtual 3D model based on the quality determination, wherein performing the one or more actions comprises outputting a description of a risk associated with the one or more quality measures.

* * * * *